US011798085B2

(12) United States Patent
Papa et al.

(10) Patent No.: US 11,798,085 B2
(45) Date of Patent: Oct. 24, 2023

(54) REAL-TIME EQUITY FINANCING PLANNER

(71) Applicant: Shoobx, Inc., Cambridge, MA (US)

(72) Inventors: Steven Paul Papa, Windham, NH (US); Jason Furtado, Boston, MA (US); Stephan Richter, Maynard, MA (US); Jordan Vance, Watertown, MA (US)

(73) Assignee: FMR LLC, Boston, MA (US)

( * ) Notice: Subject to any disclaimer, the term of this patent is extended or adjusted under 35 U.S.C. 154(b) by 165 days.

(21) Appl. No.: 16/892,059

(22) Filed: Jun. 3, 2020

(65) Prior Publication Data

US 2020/0380604 A1 Dec. 3, 2020

Related U.S. Application Data

(60) Provisional application No. 62/856,642, filed on Jun. 3, 2019.

(51) Int. Cl.
 *G06Q 40/06* (2012.01)
 *G06Q 40/02* (2023.01)
 (Continued)

(52) U.S. Cl.
 CPC .......... *G06Q 40/06* (2013.01); *G06F 16/22* (2019.01); *G06F 16/93* (2019.01);
 (Continued)

(58) Field of Classification Search
 CPC ........ G06Q 40/06; G06Q 40/12; G06Q 40/02; G06Q 40/103; G06Q 10/06375;
 (Continued)

(56) References Cited

U.S. PATENT DOCUMENTS 7,418,414 B2 * 8/2008 Dickstein ............... G06Q 40/06
705/36 R
9,286,403 B2 * 3/2016 Papa .................... G06F 16/9535
(Continued)

FOREIGN PATENT DOCUMENTS

WO WO-9946658 A2 * 9/1999 ............. G06Q 40/00

OTHER PUBLICATIONS

Schoemarker "Scenario Planning: A Tool for Strategic Thinking" (1995) (https://sloanreview.mit.edu/wp-content/uploads/1995/01/bb0aeaa3ab.pdf) (Year: 1995).*
(Continued)

*Primary Examiner* — Sujay Koneru
(74) *Attorney, Agent, or Firm* — Cesari & McKenna, LLP

(57) ABSTRACT

In one embodiment, a method for accounting for equity transactions for an incorporated legal entity in an interactive computer system is disclosed, comprising: identifying a stock option grant document stored as an electronic document on an interactive computer system, the electronic document stored in association with an electronic record of the incorporated legal entity; identifying a stock option grant in the stock option grant document, stored as core record metadata within the stock option grant document; determining a number of granted stock options using the stock option grant stored as core record metadata; subtracting the number of granted options from a stock option grant user account associated with both a user and the incorporated legal entity; and subtracting the number of granted options from an outstanding shares account associated with the incorporated legal entity, in conjunction with a stock option exercise document and as a number of granted shares.

17 Claims, 16 Drawing Sheets

(51) Int. Cl.
*G06Q 50/18* (2012.01)
*G06F 16/22* (2019.01)
*G06F 16/93* (2019.01)
*G06Q 40/12* (2023.01)
*G06Q 10/1057* (2023.01)
*G06Q 10/0637* (2023.01)
*G06F 40/103* (2020.01)
*G06Q 30/018* (2023.01)

(52) U.S. Cl.
CPC ... *G06Q 10/06375* (2013.01); *G06Q 10/1057* (2013.01); *G06Q 40/02* (2013.01); *G06Q 40/12* (2013.12); *G06Q 50/18* (2013.01); *G06F 40/103* (2020.01); *G06Q 30/018* (2013.01)

(58) Field of Classification Search
CPC .. G06Q 10/1057; G06Q 50/18; G06Q 30/018; G06F 16/22; G06F 16/93
See application file for complete search history.

(56) References Cited

U.S. PATENT DOCUMENTS

| 9,672,524 | B2 | 6/2017 | Papa et al. | |
|---|---|---|---|---|
| 10,275,779 | B2 | 4/2019 | Papa et al. | |
| 2003/0069822 | A1* | 4/2003 | Ito | G06Q 40/06 705/36 R |
| 2003/0187771 | A1* | 10/2003 | Bulan | G06Q 40/06 705/36 R |
| 2003/0208432 | A1* | 11/2003 | Wallman | G06Q 40/12 705/36 R |
| 2005/0154751 | A1* | 7/2005 | Levi | G06Q 10/10 707/999.102 |
| 2005/0187870 | A1* | 8/2005 | Grear | G06Q 40/02 705/30 |
| 2009/0299909 | A1* | 12/2009 | Levi | G06Q 40/04 705/37 |
| 2011/0231199 | A1* | 9/2011 | Cunningham | G06Q 40/06 705/1.1 |
| 2013/0046673 | A1* | 2/2013 | Kiron | G06Q 40/04 705/37 |
| 2013/0173438 | A1* | 7/2013 | Shaw | G06Q 40/12 705/30 |
| 2014/0052598 | A1* | 2/2014 | Briem | G06Q 40/04 705/37 |
| 2015/0220649 | A1* | 8/2015 | Papa | G06F 16/9535 707/722 |
| 2016/0140462 | A1* | 5/2016 | Richter | G06Q 50/18 705/7.11 |
| 2019/0080413 | A1* | 3/2019 | Chorn | G06Q 10/067 |
| 2019/0259038 | A1* | 8/2019 | Papa | G06F 21/62 |
| 2020/0184556 | A1* | 6/2020 | Celia | G06Q 30/0208 |

OTHER PUBLICATIONS

Rawson, Allie. "You get the term sheet, we do the math: introducing scenario modeling." https://carta.com/blog/scenario-modeling/, published Feb. 5, 2019, retrieved May 22, 2020.

* cited by examiner

EDIT HYPOTHETICAL STOCK CLASS

Edit any modifications to this stock class that will be made in conjunction with future investments.

| | |
|---|---|
| Class Name | Series B |
| Current Size of investment | $10,000,000 |
| Authorized Shares | 240,259 |
| Auto-calculated Authorized Shares | $41.02 |
| Original Issue Price Per Share | $41.02 |
| Auto-calculated Issue Price Per Share | $50,000,000.00 |
| Pre-Money Valuation | Non-Participating |
| Liquidation Preference | |

---

Class Name*  Series B

New Investment Amount *  $ 10,000,000

Pre-Money Valuation *  $ 50,000,000

Liquidation Preference *  Non-Participating ▼

↰ Liquidation Multiplier *  1.5   x

*Based on the information provided above, Shoobx can calculate the following information. If you would like to enter values instead of using the Shoobx calculations, you can select the fields below.*

- Override Shoobx-calculated certificate prefix.
- Override Shoobx-calculated authorized shares for this class.
- Override Shoobx-calculated original issue price.
- Override Shoobx-calculated conversion price.

FIG. 16

REAL-TIME EQUITY FINANCING PLANNER

CROSS-REFERENCE TO RELATED APPLICATIONS

This application claims priority under 35 U.S.C. § 119(e) to, and is a non-provisional conversion of, U.S. Provisional Patent Application No. 62/856,642, entitled "Real-Time Equity Financing Planner" and filed on Jun. 3, 2019, which is also hereby incorporated by reference in its entirety for all purposes.

BACKGROUND

Stock-based compensation typically, especially in the U.S., encompasses incentive stock options (ISOs), non-qualified stock options (NQOs), or less commonly for private companies, restricted stock units (RSUs). When a company's stock-based compensation is ultimately settled in stock, rather than cash, the award is classified as equity. Each share of stock has a book value that is known to the company based on the last valuation, and private companies are required to conduct a valuation once yearly (named the 409A valuation after a particular section of the IRS code). The stock options or shares are issued from a stock option pool or from the pool of issued shares of the company.

A pre-money valuation is the valuation of a company or asset before investment or financing (post-money valuation minus new investment). If an investment adds cash to a company, the company will have different valuations before and after the investment. The pre-money valuation refers to the company's valuation before the investment. If a company is raising $250,000 in its seed round and willing to give up 20% of their company the pre-money valuation is $1,000,000 (250,000 * 5−250,000=1,000,000). External investors, such as venture capitalists and angel investors will use a pre-money valuation to determine how much equity to demand in return for their cash injection to an entrepreneur and his or her startup company. This is calculated on a fully diluted basis. It follows that the post-money valuation, which is largely determined by the preferences of the investors, determines the pre-money valuation, i.e., the pre-money valuation is a dependent variable.

A post-money valuation is the value of a company after an investment has been made. This value is equal to the sum of the pre-money valuation and the amount of new equity. The post-money valuation is the sum of the pre-money valuation and the money raised in a given round (new investment * total post investment shares outstanding/shares issued for new investment). At the close of a round of financing, this is what the company is worth. If a company is worth $1 million (pre-money) and an investor makes an investment of $250,000, the new, post-money valuation of the company will be $1.25 million. The investor will now own 20% of the company. If the company's post-money after the company's first round of financing is $4 million, to achieve success, in the eyes of the company's investors, any future valuations will have to be well in excess of that amount. The post-money valuation is a heavily-negotiated term for any investment.

A class or series of shares is a type of company stock that is differentiated by the level of voting or other rights that shareholders receive. For example, a listed company might have two share classes, or classes of stock, designated as Class A and Class B. A private company may have different share classes, called Series Seed, Series A, etc., based on the date and stage of financing during which the shares were issued, with more senior shareholders typically having greater rights, such as the ability to convert their shares into later classes of shares at a particular valuation or ratio.

SUMMARY

In one embodiment, a system is disclosed for providing real-time equity planning information for a corporation, comprising: equity database storing core records pertaining to a incorporated legal entity in a computer system; an accounting module coupled to the equity database; and an output processing module, wherein core records in the equity database reflect an actual issuance of shares, and, the equity database may be configured to reflect stock holdings of the incorporated legal entity by any individual or entity.

The equity database may be configured to reflect all stock holdings of the incorporated legal entity by any individual or entity. Human-readable documents in Portable Document Format (PDF) format may be stored in association with the core records. Each of the core records reflects an issuance of shares in the incorporated legal entity to a particular entity or person. A stock option grant document may typically include all of the following, either in the document generally, or stored, in the case of the present system, as metadata: date the options were awarded; the type of options—incentive or non-qualified; the number of shares granted; the price per share; the number of shares exercised; the vested and unvested number of shares; the options cancelled; the total number of shares outstanding; and/or the exercisable number of shares. A stock option grant document may be one of: stock grants, stock certificates, simple agreements for future equity (SAFEs), keep it simple securities (KISSes), convertible debt, stock purchase agreements.

The accounting module may further comprise an equity double accounting module, and the equity double accounting module may be configured to subtract a number of shares from a share account of the incorporated legal entity whenever the same number of shares may be added to a share account of an individual or entity. The accounting module may further comprise a monetary double accounting module for tracking of monetary accounts, and the monetary double accounting module may be configured to make a debit to one account whenever a credit may be made to another account. The accounting module may further comprise an equity double accounting module coupled to a monetary double accounting module, the monetary double accounting module configured to receive messages from the equity double accounting module to transfer monies from a cash account of an individual to a cash account of the incorporated legal entity for a stock option exercise.

The output processing module may be configured to output a capitalization table in Hypertext Markup Language (HTML) or spreadsheet format, and The capitalization table accurately reflects equity holdings by all investors in the incorporated legal entity at a time of generation of the capitalization table. The output processing module may be a next round planner for understanding a potential impact of raising a new round of funding for the incorporated legal entity, and The output processing module may be configured to output in an interactive format. The output processing module may be an exit scenario planner, the exit scenario planner configured to receive growth scenario assumptions as additional user input and configured to calculate valuations of the incorporated legal entity and stock holdings for investors in the incorporated legal entity based on the growth scenario assumptions, and The output processing module may be configured to output in an interactive format.

The output processing module may be configured to enable interactive modeling of investor pro rata investment rights.

In another embodiment, a method is disclosed for accounting for equity transactions for an incorporated legal entity in an interactive computer system, the method comprising: identifying a stock option grant document stored as an electronic document on an interactive computer system, the electronic document stored in association with an electronic record of the incorporated legal entity; identifying a stock option grant in the stock option grant document, stored as core record metadata within the stock option grant document; determining a number of granted stock options using the stock option grant stored as core record metadata; subtracting the number of granted options from a stock option grant user account associated with both a user and the incorporated legal entity; subtracting the number of granted options from an outstanding shares account associated with the incorporated legal entity, in conjunction with a stock option exercise document and as a number of granted shares; adding the number of granted options to a granted option account associated with both the user and the incorporated legal entity; and adding the number of granted shares to a granted shares account associated with both the user and the incorporated legal entity.

The method may further comprise verifying that the number of granted options subtracted from the stock option grant user account may be identical to the number of granted options added to the granted option account associated with the user, and, verifying that the number of granted shares subtracted from the outstanding shares account associated with the incorporated legal entity may be identical to the number of granted shares added to the granted shares account associated with the user. The method may further comprise adding a cash amount for the stock option exercise to a cash account of the incorporated legal entity; and, creating a document with metadata indicating that cash was received from a cash account of the user in the cash amount.

BRIEF DESCRIPTION OF THE DRAWINGS

FIG. 16 is an exemplary screen of a stock class editor, in accordance with some embodiments.

DETAILED DESCRIPTION

Figure 1:
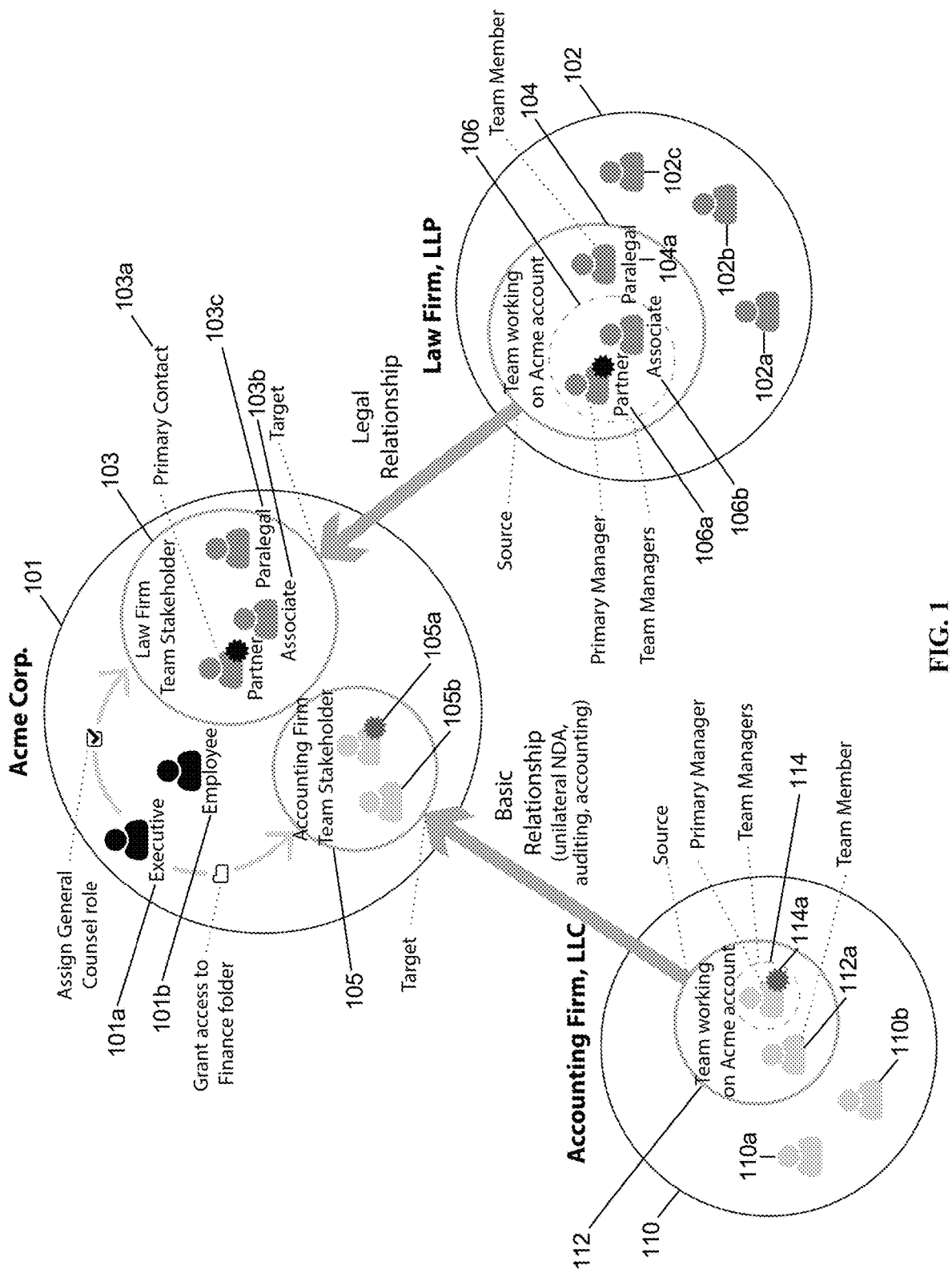
FIG. 1 is a schematic diagram of a relationship between legal entities, in accordance with some embodiments.

The state of the art for investment scenario planning has typically been limited for many years to spreadsheets, e.g., Excel, which have become increasingly complex to handle all of the different potential scenarios. However, spreadsheets are local and not global, brittle when faced with out-of-scope events and interactions; they are not consistent with each other or necessarily internally-consistent; and they do not operate in the same way every time, i.e., deterministically. More recently, web-based systems have been developed to provide investment scenario planning, but they rely on manual input of data and, consequently, the operator must understand and input the full complexity of all equities in a company. Typical models are up to 10%-15% off target in real use, due to the use of estimates for factors such as interest rates on each investment note and the size of the employee pool. The consequence is that such planning systems can only provide an estimate of what an investor's equity participation can be, because it is not able to look at all of the underlying data and all of the complexity of the underlying data, with actual numbers only being available at the time of a significant liquidity event due to calculations performed by specialized investment bankers.

For example, imagine a company that uses convertible notes for bridge financing prior to raising its next round of financing. The bridge notes are designed to be converted at the discretion of the holder, and are typically converted either when the total company valuation or the total amount of investment received is high enough—but they are able to be converted partially or not at all, and this decision is up to the discretion of the note holder. Modeling and planning for a liquidity event or exit where a bridge note is only partially converted, and modeling the financial impact of the interest rate of the debt notes based on a particular date of conversion, is beyond the capability of existing spreadsheet systems but is possible using the presently-disclosed system.

The present disclosure makes use of, and is built on, the entity and process modeling described in U.S. patent application Ser. No. 14/614227, as well as the entity relationship modeling described in U.S. patent application Ser. No. 14/946383, each hereby incorporated by reference in their entirety. The present disclosure adds methods and systems for detailed modeling of equity and cash that enable the outputting of capitalization tables (cap tables) as well as valuation charts that provide a previously-unavailable level of fidelity and accuracy. The details and correctness are based on true, a priori documents and states of the company entity. As it is based on the actual legal documents underlying the formation and operation of a corporate entity, the data representations created by the present system are suitable for handling company transactions and investment scenario planning. As well, the present system provides visualizations that provide information about potential future investment outcomes for each investor in a company at different exit amounts.

FIG. 1 is a schematic diagram of a relationship between legal entities, in accordance with some embodiments. Corporation 101, "Acme Corp," is a corporation represented in the system as an entity. Corporation 101 may have an executive, such as the chief executive officer, represented in the system, 101a, as well as an employee 101b. Corporation 101 may have a relationship with a law firm 102, "Law Firm, LLP," as well as with another company 110. The relationship with the law firm may be a legal relationship. The relationship with the other company 110 may be a variety of other corporate relationships, but could be, for example, a relationship with a financial auditing firm, a relationship with an accountant, or a relationship with a party with whom corporation 101 wants to share information under a non-disclosure agreement.

One aspect of the corporate relationships in the current disclosure is that when two companies enter into a relationship, a source entity provides a group of people, called a relationship team, to a target company. This is shown in FIG. 1. Law firm 102 provides relationship team 104 to Acme Corp 101. Within Acme Corp, the relationship team 104 is represented as team stakeholder 103. Team stakeholder 103 belongs to Acme Corp and its members can receive delegated access rights, roles, and other privileges that may be delegated to it by Acme Corp, through executive 101a.

Acme Corp 101 contains law firm team stakeholder 103, including Law firm's 102 Acme relationship team members 104a, 106a, 106b as represented stakeholders 103c, 103a, 103b, respectively. The primary manager 106a is designated as the primary contact 103a. Acme Corp 101 also has team stakeholder 105, including represented stakeholders 105a, 105b, whereby 105a is the primary contact for that team stakeholder 105.

Law firm 102 contains relationship team 104, which further contains a subset 106 of the relationship team that are managers of the relationship. Partner 106a and associate 106b may be managers. Paralegal 104a may be a member of the relationship team. Other personnel 102a, 102b, 102c, 102d, 102e may not be part of the relationship team, and may not have access to any information or rights pertaining to Acme Corp 101.

Certain employees of law firm 102 may be partners, 106a, 102b, 102d. Other employees may be associates 106b, 102a, 102e, or paralegals 104a, 102c. Partner 106a may be designated the primary manager, and may have all management and access rights delegated to law firm 102. Not all the partners of law firm 102 may have any access to Acme Corp 101.

Company 110 includes relationship team 112, further including managers 114. Person 114a may be the primary manager. Person 112a may be a member of relationship team 112, and persons 110a, 110b, 110c may be contained within company 110 but not be part of relationship team 112, giving them no access to Acme Corp.

Acme Corp 101's executive 101a has authority by virtue of his or her title in the organization. This title may be stored elsewhere in the system as a core record, as described elsewhere herein and/or in U.S. patent application Ser. No. 14/614,227. Executive 101a may delegate access to, for example, the H.R. documents of Acme Corp. to team stakeholder 105, and thereby to persons 105a and 105b, who are employed by company 110 and are on its relationship team 112. Person 105a and person 114a may be references to or instances of a single user on the system. Person 105b and person 112a may be references to, or instances of, another single user on the system. Although two references exist to the same person on the system, one instance is logically contained within Acme Corp 101, and another instance within company 110, and each instance may have different roles and access rights.

In this disclosure, and in some embodiments, the instance located within company 110 is called the source, and the instance located within company 101 is called the target. The relationship between Acme Corp 101 and company 110 is therefore unidirectional, with company 110 as the source providing a team of people to Acme Corp 101 as the target. Within the target entity, a single person may be designated a primary contact. Within the source, the same person may be designated the primary manager. At the source, the primary manager may delegate access rights pertaining to Acme Corp 101 to one or more persons within the relationship team 112 at the source. At the target, the primary contact 105a receives all communication, for example email, that is sent to team stakeholder 105.

Team stakeholders 103 and 105 play a role in enabling personnel of company 102 and company 110, respectively, to have access rights within company 101. In some embodiments, the rights within company 101 are tied to a stakeholder record. However, a special stakeholder record type, called a team stakeholder, is used in the system to permit rights to be shared to other entities.

As described in patent application Ser. No. 14/614,227, any stakeholder record can be assigned roles. It is transparent to the system and the stakeholders within an entity, such as Acme Corp 101, whether those roles are granted to a stakeholder representing a person or a team stakeholder representing another entity. For example, FIG. 1 shows that Acme Corp. uses an outside law firm 102 to be its general counsel. In another embodiment, Acme Corp 101 could also assign the General Counsel role to a person stakeholder.

In some embodiments, a legal relationship, such as the relationship shown here with respect to law firm 102, may be considered special by the system. For example, review of documents and contracts by lawyers may be a suggested or required step in many different workflows in the system, and as such, lawyers may be accorded special status, in some embodiments. As another example, a small company may outsource its general counsel role to a law firm. As a general counsel has the legal authority to perform all, or almost all, actions on behalf of a company, this results in the law firm having a high level of access to the company. In some embodiments, this behavior may be encoded in key data structures, in workflows or other business logic, or in user interface logic, or in more than one of these.

Figure 2:
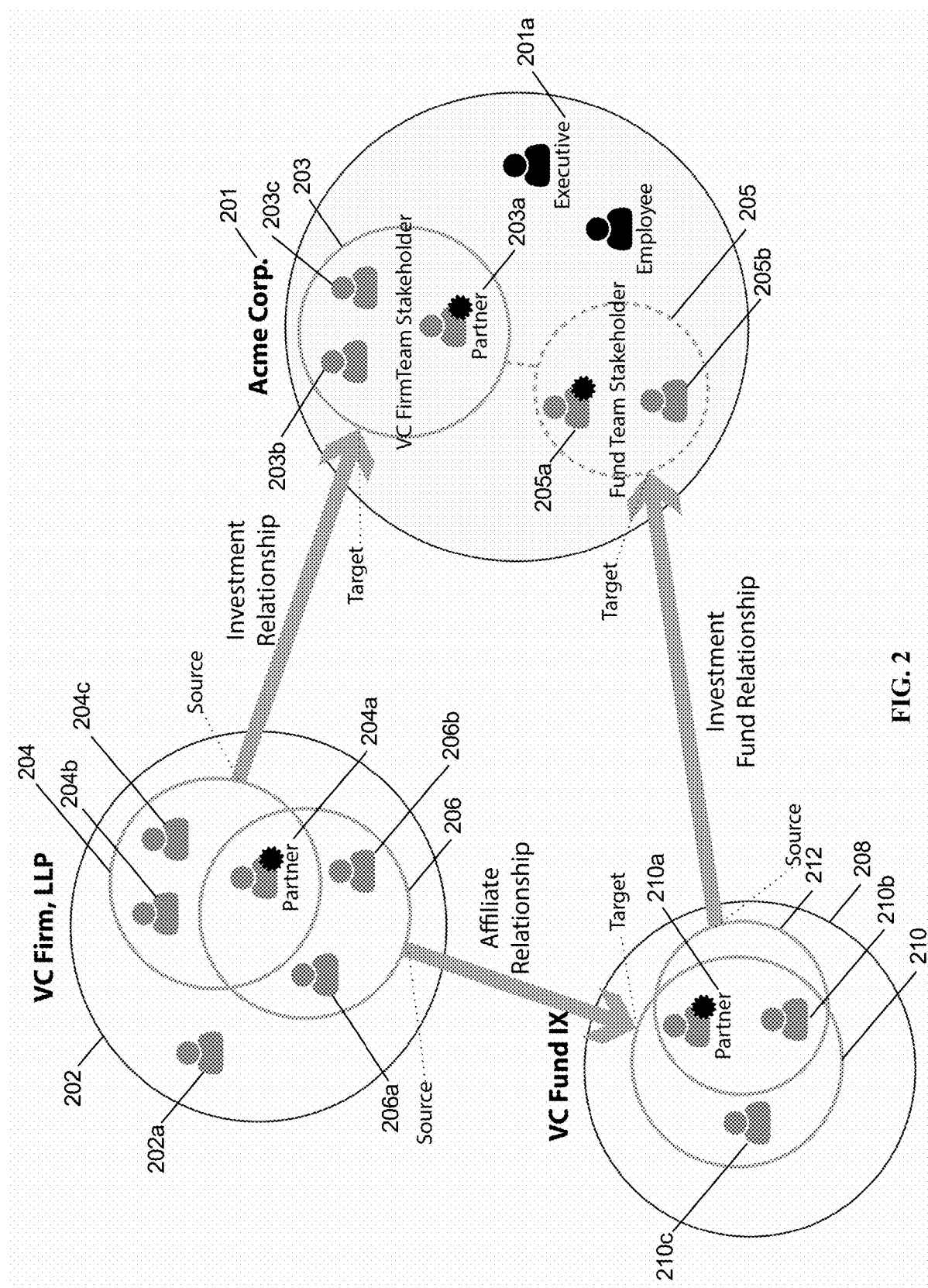
FIG. 2 is a schematic diagram of a relationship between an investment firm, one of its affiliate funds, and a company, in accordance with some embodiments.

FIG. 2 is a schematic diagram of a relationship between an investment firm, one of its affiliate funds, and a company, in accordance with some embodiments. Acme Corp. entity 201 includes executive 201a, VC firm team stakeholder 203, and VC fund team stakeholder 205. VC firm entity 202 includes relationship team 204 and relationship team 206. VC firm entity also includes VC partner 202a, who is not involved with Acme Corp; VC partner 204a, who is involved with Acme Corp and is the primary contact; associates 204b and 204c, who are involved with Acme Corp; and associates 206a and 206b, who are involved with VC fund entity 208. VC fund entity 208 includes relationship team 210, which includes primary contact/partner 210a and associates 210b and 210c, and relationship team 212, which includes primary contact/partner 210a and associate 210b. VC firm team stakeholder 203 includes primary contact 203a and team members 203b and 203c all of which are enabled to have access rights to Acme Corp 201 within the context of VC team stakeholder 203. VC fund team stakeholder 205 includes primary contact 205a and person 205b who are enabled to have access rights.

The relationship between Acme Corp. 201 and VC firm 202 can be described as an investment relationship. However, private equity and venture capital firms generally invest their money in companies indirectly, through affiliate entities that are set up individually for each fund. In order to model this type of relationship properly in the disclosed system, an investment fund is enabled to be modeled as its own entity, here VC fund IX 208, which has an affiliate relationship with VC firm 202. Also, as it is preferable for a user of the system, either an executive of Acme Corp 201 or a partner in VC firm 202, to see the investment as being an investment by the VC firm and not by the fund, the two entities 203 and 205 may be coalesced by the business logic or user interface logic of the system so that a user sees the VC firm as the only entity and does not see the VC fund entity, in some embodiments, except when it is desired to see the VC fund entity itself. Coalescing certain relationships in this way enables the system to model these relationships without the use of chaining relationships, such that only one level of relationship is required to be implemented in the system.

Figure 3:
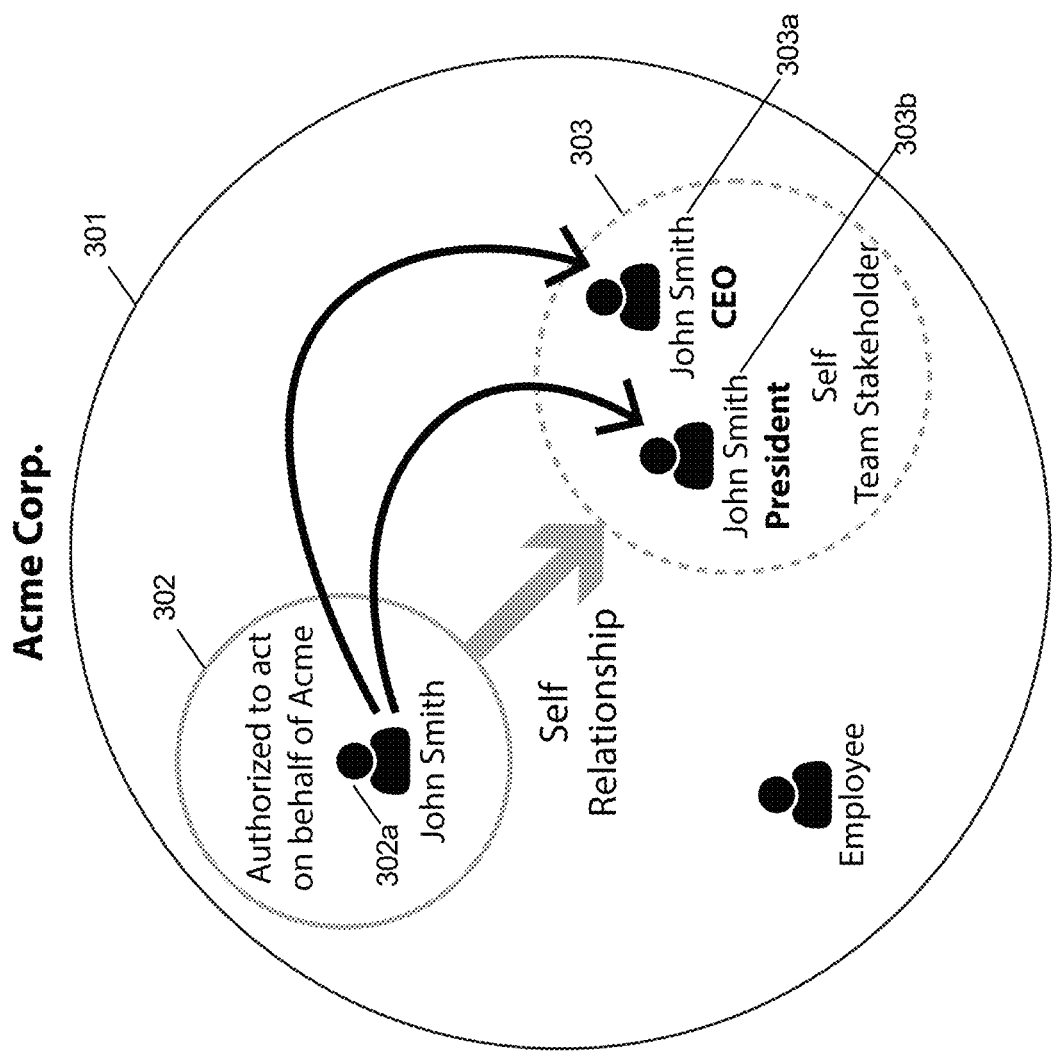
FIG. 3 is a schematic diagram of a self-relationship in an entity, in accordance with some embodiments.

FIG. 3 is a schematic diagram of a self-relationship in an entity, in accordance with some embodiments. While the above paragraphs describe how a person is able to act on behalf of a third party company or other entity, in the more common case, a person may need to act on behalf of the company he or she is a member of, which is enabled, in some embodiments, as shown in FIG. 3. Entity Acme Corp. 301 contains or includes a user 302a, "John Smith," who corresponds with a single user. John Smith and another employee 301a are part of entity 301. John Smith 302a is further contained within a team 302, stored via an ordinary enity record, that contains stakeholders who can act on behalf of Acme Corp. 301.

Team stakeholder 303 is also contained within the entity record 301 for Acme Corp. Users are able to sign documents and perform actions on behalf of Acme Corp. if they are members of a team stakeholder assigned to certain Acme Corp. actions. Team 302 is the source in a unidirectional relationship with target 303, whereby both, the source and target entities, are Acme Corp for this special self-relationship. Team 302 shares team member 302a, "John Smith," with Acme Corp via the self relationship. John Smith 302a may be shared either as a person with a CEO role 302a or a person with president role 302b. In this way, Mr. Smith may execute actions under multiple roles within Acme Corp.

Figure 4:
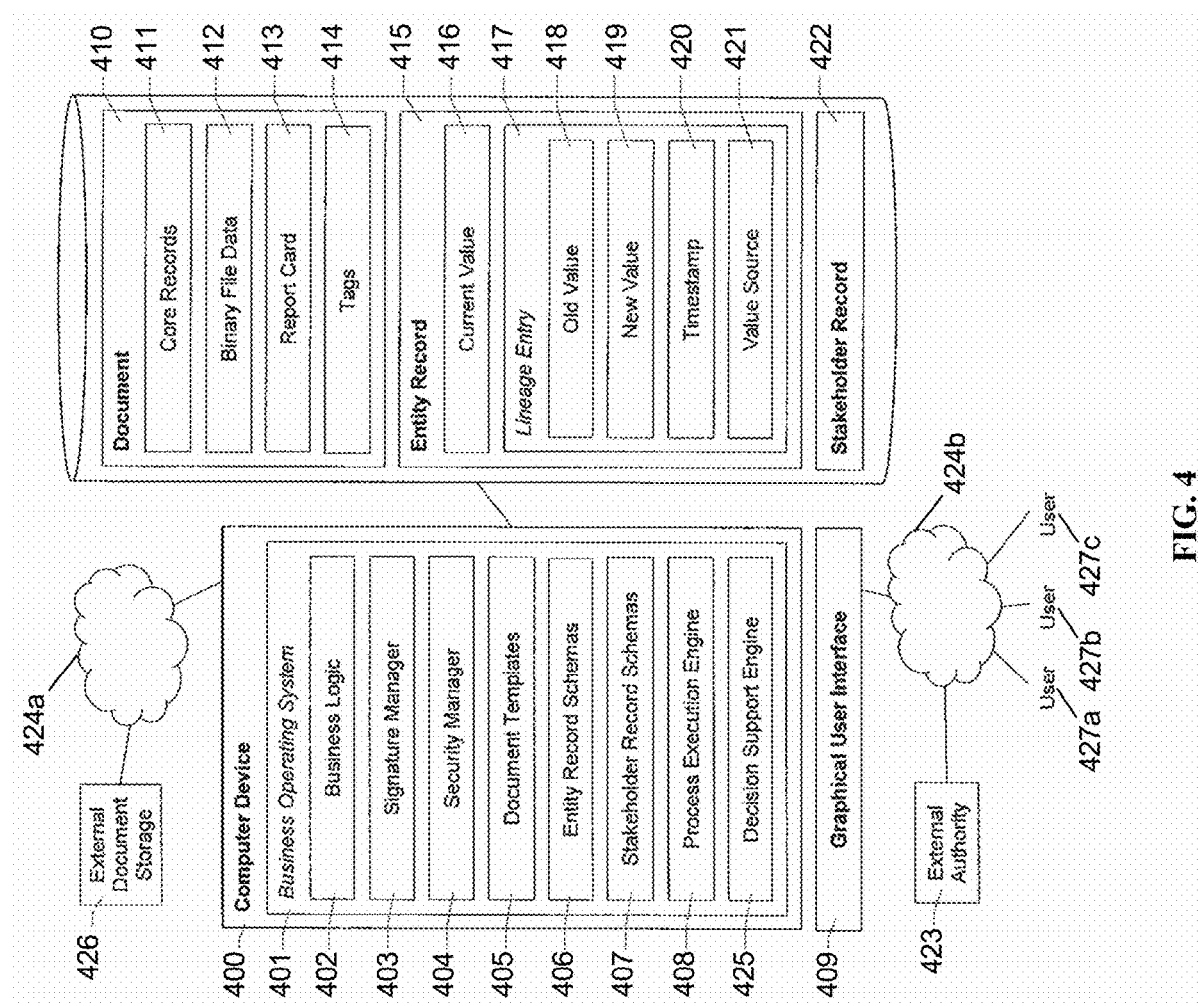
FIG. 4 is a schematic diagram of a system in accordance with some embodiments.

FIG. 4 is a schematic diagram of a system in accordance with some embodiments. Computer Device 400 may be an application server, or a group of application servers, such as the app tier 503 shown in FIG. 5. Computer Device 400 may be an application server, or a group of application servers. Computer Device 400 includes a business operating system 401, which further includes business logic 402, signature manager 403, security manager 404, document templates 405, entity record schemas 406, stakeholder record schemas 407, process execution engine 408, and decision support engine 425. Business logic 402 may be one or more business processes, configured to be executed by process execution engine 408. Examples of a business process are: incorporation; nomination of a board; creating board resolutions; creating a stock plan; granting stock to an employee; and identifying a consultant or an employee, among other examples. Signature manager 403 may provide functionality and services for storing electronic signatures, retrieving prior-stored signatures, and reading and writing quick response (QR) codes. Security manager 404 may provide functionality pertaining to the security of the system, such as logging, transaction monitoring, authentication and authorization, auditing and reporting, as well as interfacing with third-party security functionality and services.

Document templates 405, entity record schemas 406, and stakeholder record schemas 407 provide the framework for data to be stored on the system. Document templates 405 provide templates for a variety of types of documents. As the documents are intended to be legal documents for a company's business processes, some or all of the document templates may be authored by attorneys according to state and federal law, with particular attention to Delaware corporate law. The document templates may be predefined and inalterable, or they may be alterable such that a company may make changes to the document templates by uploading new templates, or the document templates may be individually alterable. The entity record schemas 406 may include schemas for various types of corporate entities, such as S-corporations, C-corporations, limited liability corporations and partnerships, and may include parameters such as state of incorporation, address of incorporator, address of corporation, primary address, board membership, corporate structure, and other parameters. The stakeholder record schemas 407 may define a stakeholder as a person within the context of the entity, with contact information for the person such as address, email address, and phone number(s), and may also define a stakeholder as having one or more roles, such as board member, board secretary, shareholder, corporate officer, or other roles. A single stakeholder may hold more than one role; a user may also hold one or more roles for one or more corporate entities.

Decision support engine 425 may provide analytics for real-time reporting during the execution of a business process, based on data available to the business operating system. For example, if multiple people known to the business operating system have the title "Chief Engineer," the system may be able to compute basic analytics on this set of people to provide information regarding their average and median salary, stock compensation, etc., in real time such that at the time a new hire contract is being created on the system, the relevant information is provided to the user. Decision support engine 425 may rely on external document storage 426 for this information, and may also rely on business logic 402 and process execution engine 408 to determine when the decision support engine 425 may be invoked.

Application server 400 may interact with external document storage 426 via network 424a. In some embodiments, external document storage 426 may be for storing generated documents in binary format only, such that a user may be able to retrieve relevant legal documents at any time without use of the business operating system 401. The external document storage provider may be, for example, Box.com, Dropbox, Google Drive, a private WebDAV file store, or any other cloud-based content storage solution. In other embodiments, external document storage may be used for storing all information, including information formatted according to document templates 405, entity record schemas 406, and stakeholder record schemas 407. Application server 400 may also interact with external authority 423 and users 427a, 427b, 427c via network 424b. An external authority 423 may be provided for authenticating users on the system. For example, an external authority may provide two-factor authentication support such that a user may be authorized by the external authority before being granted access to business operating system 401. Graphical user interface 409 may provide a visual interface to business operating system 401; the user interface 409 may appear in a web browser and may combine results and outputs from multiple parts of business operating system 401 into a single outputted HTML page. In some embodiments, the HTML page may contain functionality as well, such as input validation functionality performed in JavaScript, in order to provide higher-quality data to the underlying system.

Document 410 includes core records 411, binary file data 412, report card 413, and tags 414. Entity record 415 includes current value 416 and lineage entry 417, which includes old value 418, new value 419, timestamp 420, and value source 421. Stakeholder record 422 is also shown. Each of the above data objects is stored in a database at a database server, and may be stored in a relational database, such as PostgreSQL, in a non-relational manner, such as in the JSONB format. In some embodiments, data elements may comprise references to other data objects. For example, the binary file data 412 in document 410 may be actual binary file data stored in a database, or may be a reference to binary file data stored outside of a database, for example, as a uniform resource indicator (URI) indicating the location of a file accessible via HTTP from another server. Also, the value source 421 that is part of lineage entry 417 may be a reference to another object, such as another document object, and may not be the object itself. In some embodiments, an array of lineage entries may be stored in entity record 415.

Document 410 is intended to permit multiple core records 411 to be associated with the document. For example, a certificate of incorporation would have at least a core record for the company's address and another core record for the founders of the company. In some embodiments, the report card may or may not be present; when present, the report card may be updated at the time the document object is saved or at a later time based on when processing resources are available for calculating the trustworthiness of the data associated with the document. In some embodiments, a single binary file data object 412 is associated with one document object 410. Documents may be associated with entity records as well, in some embodiments.

In some embodiments, tags 414 are free-form text and may be human-readable. Multiple tags may be associated with a single document. In some embodiments, the tags may have a hierarchical structure to facilitate search and retrieval. Certain tags may be special; for example, the "active" tag indicates to the system that a document is legally in effect, and may be automatically updated when a new document is created or when an older document is superseded; also, entity records may be associated with documents as tags, in some embodiments. Superseding of a document may be quickly determined by the system performing a search for the type of document, e.g., "stock option plan," to find all documents with a particular type for a particular entity record.

In some embodiments, an entity record 415 may include both a current value 416 and a lineage entry 417. Although an entity record contains a current value 416, the entity record's current value 416 duplicates the value stored in the lineage entry. This facilitates retrieval of the value without dereferencing any references in the lineage entry, and may be thought of as a cached value. Lineage entry 417 includes at least a value source 421, to indicate that the lineage of the current value is originally from that other object. Lineage entry 417 may also include old value 418, which is the value that was previously stored in the entity record; new value 419, which is the same as the current value 416 and the value of that entity in value source 421; and a timestamp 420. Current value 416 may be thought of as a cached value. Current value 416 points to an up-to-date value of the core record, even if the core record has been modified.

Value source 421 may be a reference to another object, such as a document. For example, if a stock option plan was put into place at a prior date, the number of authorized shares of a corporation would be determined by the active stock option plan document, so although the entity record for the corporation could include the number of shares of the corporation, it could also indicate that the number of shares originated in the active stock option plan document. An auditor would thus be able to determine the source of the number of shares upon later review.

In some embodiments, a value source 421 may be a stakeholder record and not a document. This may occur when a value is manually entered without reference to a prior document, or when a document is uploaded and does not contain generated values in the system.

In some embodiments, stakeholder record 422 may include one or more roles (not shown), as well as basic information about the stakeholder, such as name, address, phone number, email, and so on (not shown). A role indicates what actions that may be performed or initiated by the stakeholder.

Figure 5:
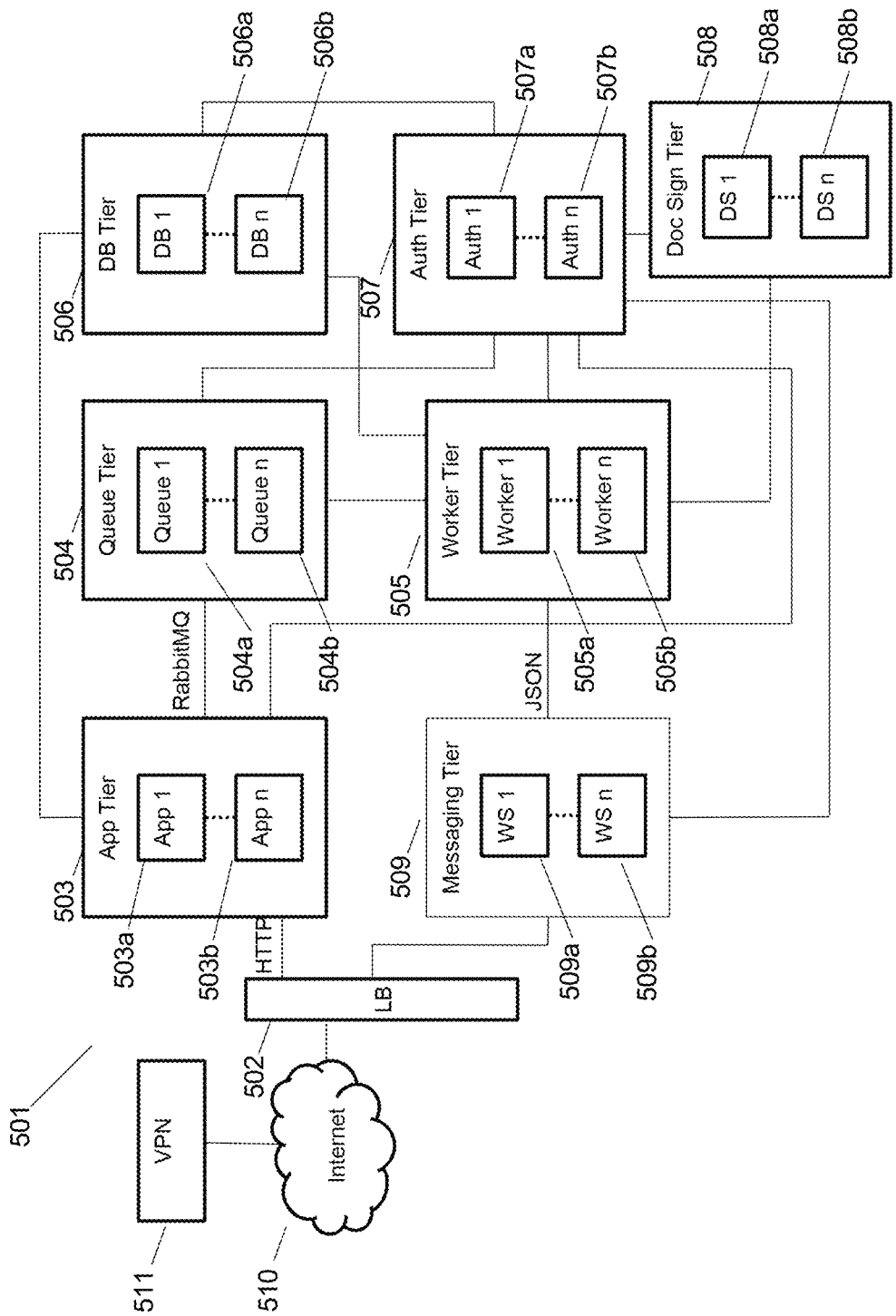
FIG. 5 shows a network diagram of a platform for providing the services described herein, in accordance with some embodiments.

FIG. 5 shows a network diagram of a platform for providing the services described herein, in accordance with some embodiments. Business operating system platform 501 may include load balancer 502, app tier 503, queue tier 504, worker tier 505, database tier 506, authentication tier 507, document signing tier 508 and messaging tier 509. Each tier may include one or more servers that may be virtual servers or physical servers. The servers may be activated or deactivated as needed based on load parameters that may be determined by the business operating system, wherein the load parameters include CPU load and network bandwidth utilization.

Load balancer 502 acts as a gateway between the remainder of platform 501 and the public Internet, in some embodiments. Load balancer 502 also may allocate incoming requests among servers in app tier 503. In some embodiments, an HTTP load balancer such as nginx may be used.

App tier 503 includes one or more web servers 503a, 503b for receiving web requests via Hypertext Transfer Protocol (HTTP), in some embodiments. The web servers may then determine what tasks, if any, need to be distributed to either a database tier 506 or a queue tier 504. The web servers may then return fully- or partially-rendered web pages to a requesting web browser. As the web browsers are behind load balancer 502, different servers may service different web requests. In some embodiments, the web servers may be web application servers, and the applications running on them may be precompiled, linked at runtime, Common Gateway Interface (CGI) applications, modules executed by a web server process, or otherwise executed. The web servers may also integrate their own load balancing, in some embodiments. In some embodiments, load balancing may occur only at 502, only at 503, or at neither, or both points in the system.

The queue tier 504 and the worker tier 505 may include one or more servers, and may include a facility to activate or deactivate servers as needed to meet the needs of the service, in some embodiments. The queue tier 504 may receive requests from the app tier 503 and may identify sub-tasks, which may then be sent to worker tier 505 to be executed. The queue tier 504 may use a queuing messaging protocol such as RabbitMQ for assigning tasks to processes at the worker tier, in some embodiments. The queue tier 504 may use the Celery queuing software with well-known queuing algorithms to provide reliable service.

The worker tier may execute sub-tasks, such as rendering documents, executing processes, requesting data from database tier 506, and sending emails, in some embodiments. The sub-tasks may execute at the worker tier as threads, processes, or via another processing abstraction that is capable of being processed in parallel. The sub-tasks may involve one or more requests for data from other servers or network nodes. Rendering documents may cause portions of documents to be rendered to text, Hypertext Markup Language (HTML), partial HTML (HTML snippets), JavaScript, JSON, Portable Document Format (PDF), the ReportLab report markup language (RML), or another format. Rendering documents may also involve combining data stored in core records with data stored in or generated by document templates, as described above. In some embodiments, reports, including reports generated by ReportLab from RML, and including audit reports and logs, may be generated. In some embodiments, documents may be generated based on user input and then sent back to the app tier 503 for authentication by the authentication tier 507.

Execution of processes may involve the use of processes stored as eXtensible Markup Language (XML), XML process definition language (XPDL) workflows, or other data that define the process, and may involve the creation of or modification of entity records, core records, stakeholder records, or other records. Emails may be sent by the worker tier to, for example, send reminders about approaching deadlines or to send password reset messages. When worker tier 505 completes work and/or receives an appropriate response from one or more other servers, it sends a message, which may be HTTP JSON, to a messaging tier 509, which is responsible for assembling a reply and sending it back to a requesting user via load balancer 502.

Database tier 506 may receive requests for data from worker tier 505, and may retrieve information stored in the form of one or more core records, entity records, or stakeholder records. Data may be written to one or more databases as serialized JSON objects. The database tier 506 may use a database that enables JSON storage, such as PostgreSQL 9.4 or above using the JSONB data type. Data from multiple entities may be distributed across database servers in various ways. In some embodiments, all data for a particular corporate entity may be placed on a single database server, enabling sharding of large databases on a per-entity basis and providing added security for each entity. Data may be requested from the database tier by a worker tier or by the app tier directly. When data is needed to perform a task or sub-task, in some embodiments, the worker tier may cause data to be retrieved from the database tier. In other embodiments, the queue tier may create data retrieval requests from the database tier, or both the queue tier and the worker tier may send requests to the database tier. When data is created by the worker tier, for example, an HTML snippet, a complete PDF file, or a new or modified entity record in a corporate entity, data may be sent to and stored in the database tier 506 as JSON. In some embodiments, a cache or alternative data structure server such as memcached or Redis may be used for improving the read/write performance of database tier 506.

Also shown are authentication tier 507 and document signing tier 508. Authentication tier 507 serves to identify whether the logged-in user has the proper credentials to perform a particular process or sign a particular document. Authentication tier 507 may use the lightweight directory access protocol (LDAP) within an organization, or using an LDAP server (not shown), to authenticate a user. Authentication tier 507 may use the Red Hat FreeIPA suite, which includes LDAP, for managing identity, policy, and audit functions, including for keeping an audit log. Authentication tier 507 may also use Kerberos to permit users and other nodes securely prove their identity, or to securely prove the identify of the platform to external providers. Authentication tier 507 may permit the use of two-factor authentication. Document signing tier 508 may be responsible for communicating with a third-party system, such as Global Sign, to cause the third-party system to use a root-authenticated certificate to cryptographically sign the document after it is finalized, using Adobe Certified Document Services (CDS), to prevent modification of the document. The cryptographically-signed document may be saved to database tier 506 as a PDF associated with a document object.

Document signing tier 508 may use a Java library to communicate with a secure signing service located at an external network provider. Document signing tier 508 may include modules for interpreting both Java and JSON, for communicating with services internal to system 501.

One or more of the above application servers, web servers, load balancing servers, database servers, or other servers may be running a Linux operating system. In some embodiments, when used in a production role, the servers may be configured to have a minimum of services active, excepting only the specific services described above. This has the advantage of increased security, which is desirable when performing corporate processes and providing secure authentication services. In other embodiments, the servers may have additional active services. In some embodiments, a virtual private network (VPN) server 511 may provide the sole connection to the outside Internet for the system, thereby acting as a security gateway. In other embodiments, users may connect directly via network 510 to the system. Whether or not a VPN is used as a security gateway, access to applications may be limited through the load balancer as a gateway.

In some embodiments, one or more of the servers described may operate using the Linux operating system, and/or using an Ubuntu distribution of Linux. Various messaging protocols may be used between tiers, including for message passing; for example, RabbitMQ and Celery queuing and message passing middleware may be used. HTTP and JSON may be used as protocols for transmitting data. The web servers may use web applications written in Python in conjunction with a web server, such as the Nginx web server. Caching may be performed at one of the app tier, queue tier, or database tier using a web cache or object cache such as Redis. Servers as described herein may be virtual servers. Access to the platform may be partially limited to or solely through a virtual private network (VPN).

Figure 6:
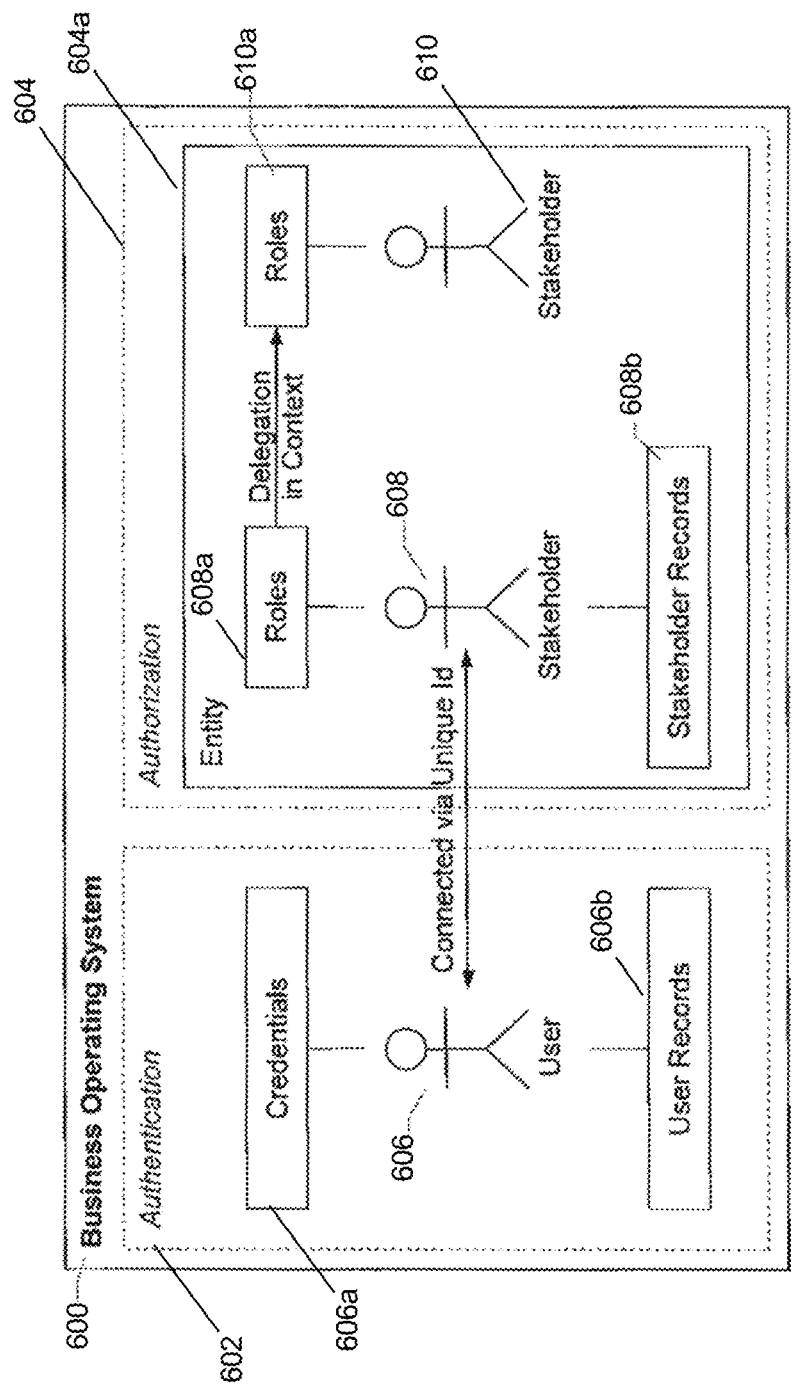
FIG. 6 is a schematic diagram of users and stakeholders and their security roles, in accordance with some embodiments.

FIG. 6 is a schematic diagram of users and stakeholders and their security roles, in accordance with some embodiments. Business operating system 600 includes an authentication module 602 and an authorization module 604. Authentication module 602 is for identification of the user, e.g., is the user who he or she claims to be? Authentication module 602 includes credentials 606a and user records 606b for user 606. Authorization module 604 is for determining whether the specific user should be permitted to take a specific action, e.g., has the user been assigned the capability to perform this action? All records for the authorization module relate to at least one specific entity 604a; additional entities are not shown but may be present. Stakeholder roles 608*a* and stakeholder records 608*b* are associated with stakeholder 608. Additionally, stakeholder 608 may have received delegated roles 610*a* from stakeholder 610. Authorization module 604 also may determine what information the user has access to in the system. Authorization module 604 may use roles to determine what information, actions, or capabilities the user has access to.

In operation, user 606 may present his or her credentials to the system, which are matched against credentials 606*a* to verify the user's identity at authentication module 602. In some embodiments, two-factor or multi-factor authentication may be used. Once the user has authenticated, the user records 606*b* are retrieved by the system and all entities for which the user is a stakeholder are retrieved by the system as well, using the unique IDs for each user-stakeholder pair. Next, each user-stakeholder pair is evaluated for its roles 608*a*, 610*a* to determine whether a certain task is permissible. As each role includes permissions for many different actions and access to various information, role may be thought of as a keychain, containing many keys. In some embodiments, a context of the user on the system is taken into account in addition to roles (e.g., additional capabilities may be granted to a human resources user when the actions are performed on or from a human resources landing page, sub-site, or section of the user interface).

Figure 7:
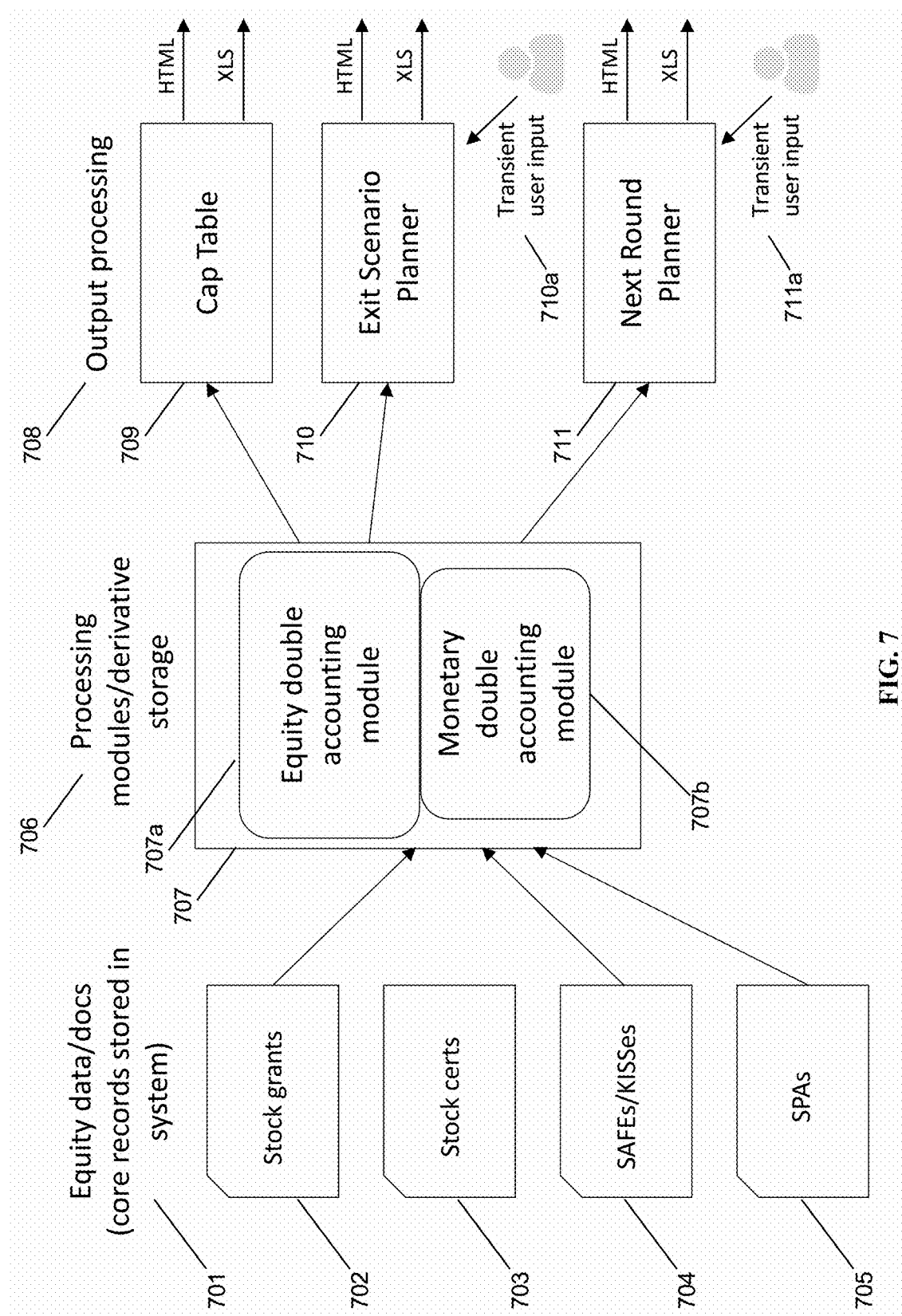
FIG. 7 is a schematic diagram of equity data flows, in accordance with some embodiments.

FIG. 7 is a schematic diagram of equity data flows, in accordance with some embodiments. At a high level, equity data and documents are stored 701 as core records in a system, as described herein. The data is passed to processing modules 706 according to user input that results in initiation of processes in the system. The output of the processing modules is provided 708 in various forms to the user, for reporting as well as interactive use.

Turning to equity data and documents 701, various forms of documents are present in the system, including: stock grants 702; stock certificates 703; other types of equity grant documents, such as SAFEs (Simple Agreements for Future Equity) or KISSes (Keep It Simple Securities) or other convertible debt, or SPAs (stock purchase agreements) 705. The equity data and documents 701 are references to specific documents that are stored elsewhere in the system. As understood from the prior patents and patent applications incorporated by reference in this disclosure, human-readable documents, for example, in Portable Document Format (PDF) format, are stored in association with metadata, known as core records. Each of these documents reflects an issue of shares in the company to a particular entity or person, and the underlying documents provide all core records (information) needed to perform processing. For example, such a stock option grant document may typically include all of the following, either in the document generally, or stored, in the case of the present system, as metadata: date the options were awarded; the type of options—incentive or non-qualified; the number of shares granted; the price per share; the number of shares exercised; the vested and unvested number of shares; the options cancelled; the total number of shares outstanding; and/or the exercisable number of shares. It follows that, as well, each document reflects an actual issuance of shares; all documents when viewed together reflect all shares that have been issued by the company (therefore acting as a stock ledger for the company); and, any stock holding by any individual or entity is fully reflected in the system.

Turning to processing modules 706, a system 707 is shown that includes both an equity double accounting module 707*a* and a monetary double accounting module 707*b*.

The inventors have understood that, in order to provide the accuracy needed for performing the financial calculations discussed herein, it is desirable to have a system that provides certain checks and balances in accordance with general principles of accounting. Accordingly, the processing system 707 may be configured to make a debit to one account (or ledger, or list) every time it makes a credit to another account, similar to the well-understood technique of double-entry bookkeeping. This is possible in the present system because the system already contains a well-defined and complete list, or account, of the relevant accounts of the company. For example, since the system has the documents of incorporation of the company, the system has a list or account of all shares issued by the company; since the system has the document detailing the incentive stock option (ISO) plan of the company, the system has a list or account of all ISOs issued by the company; etc. The equity double accounting module 707*a* is separate from, but interoperates with, the monetary double accounting module 707*b*. In certain embodiments the monetary double accounting module is used primarily to enable users of the system to settle transactions for the exercise of stock options, although the inventors have conceived of the use of this monetary double accounting system to provide general corporate financial accounting as well.

Processing modules 706 are responsible for receiving an instruction to perform a process or workflow, for example, to grant or exercise a number of options to or by a particular user, and to add/subtract options and shares as appropriate within the internal data stores of the system. Each process or workflow generates its own documents, and these documents have their own metadata, including core records and timestamps, so that the operation of the processing module 706 is verifiable and checkable subsequent to operation. After operation, the processing module generates a final list of accounts that is up to date and that contains metadata links to the documents in the system that correspond to the transaction. Timestamps are kept at an arbitrary level of accuracy (at least POSIX timestamp granularity, in some embodiments) to enable multiple transactions to be accurately synchronized and ordered, even when implemented across a distributed system or the Internet.

Although the processing module 706 completes the relevant transaction, in many cases it is desirable to provide additional useful outputs to the user. Turning to output processing 708, three types of output processing are contemplated: a capitalization table 709, an exit scenario planner 710, and a next round planner 711. Additional output processes are also enabled by this disclosure.

The capitalization table module 709 produces a cap table in HTML or XLS format, as is readily understood by private company investors and accounting professionals. A typical cap table may include an analysis of a company's percentages of ownership, equity dilution, and value of equity in each round of investment by founders, investors, and other stakeholders (including debt, convertible debt, option, warrant, and derivatives holders). This cap table is completely up to date using all documents of the company (which are all known to the system) as of the specific time that it is generated by the module 709. This provides the ability for an option-holder to exercise options and then to immediately view their stock ownership percentage, for instance.

The exit scenario planner 710 provides an investor with the ability to understand their potential participation in any gain or growth by the company, including the ability to understand different scenarios of growth. As it is a scenario planner for future scenarios, the value of the planner is dependent on the assumptions made, and therefore this module 710 enables a user to provide user input 710a. The user input is used to calculate various valuations, waterfalls, etc., but is transient and is not saved to the system in the form of core records (although it may be persisted in a web application or web application database for subsequent use by the user). This module 710 also outputs in either an interactive HTML format (especially useful when using interactive user input) or an XLS format. Further examples of the exit scenario planner are detailed below.

The next round planner 711 provides a company executive or founder, etc. to understand the potential impact of raising a new round of funding on other investors in the company. As with the exit scenario planner, this module 711 greatly benefits from an interactive mode where a user is enabled to provide transient user input 711a. This module 711 also outputs in either an interactive HTML format (especially useful when using interactive user input) or an XLS format. In some embodiments, all exit scenarios and next round scenarios can be exported to a cap table, HTML, PDF, XLS, etc. Further examples of the next round planner are detailed below.

Figure 8:
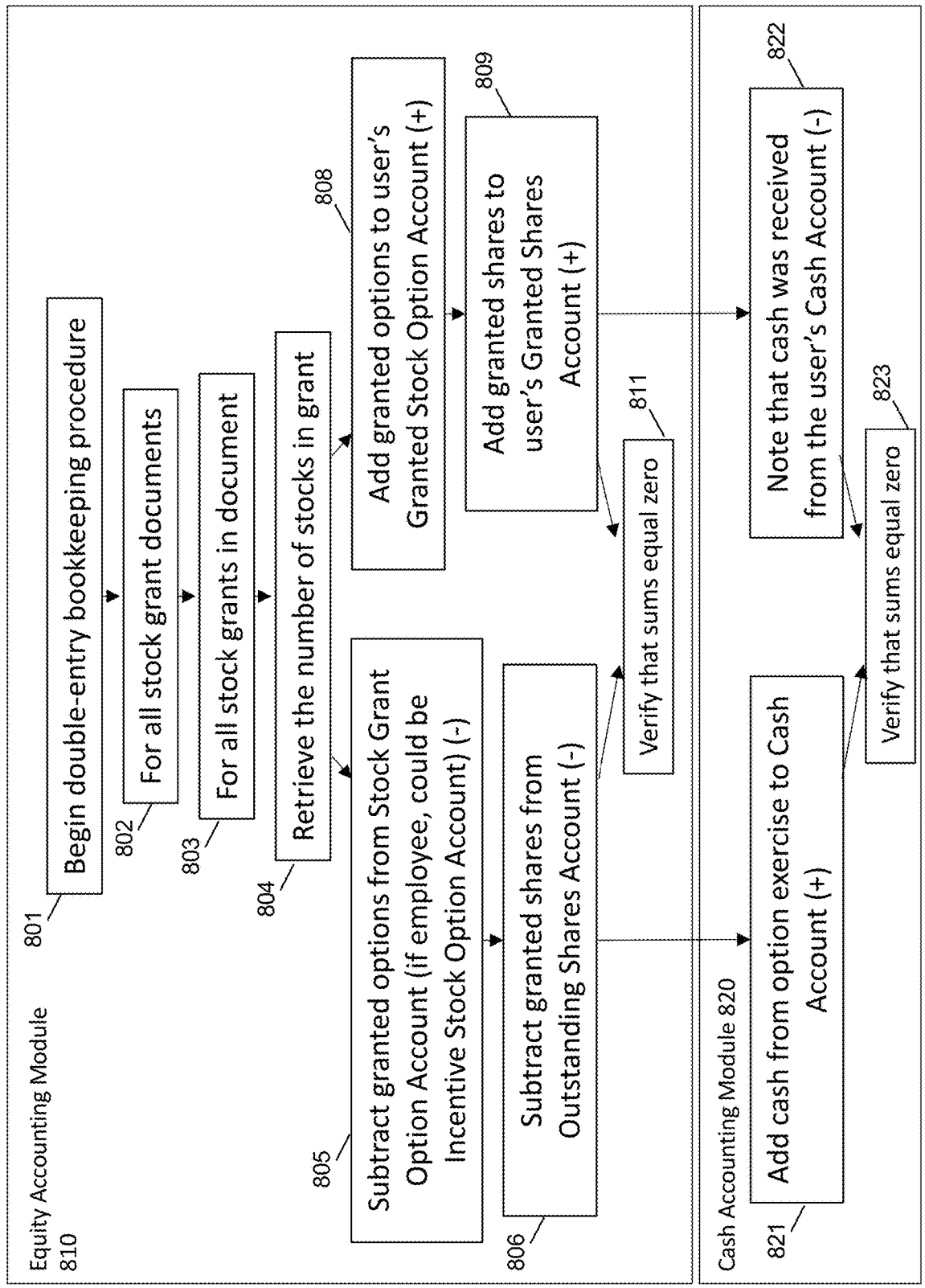
FIG. 8 is a flowchart showing the operation, in some embodiments, of an equity accounting module and a cash accounting module.

FIG. 8 is a flowchart showing the operation, in some embodiments, of an equity accounting module and a cash accounting module. Equity accounting module 810 adds and subtracts equities (options or shares) in pairs from accounts stored in the system. Cash accounting module 820 similarly adds and subtracts notional cash in pairs from accounts stored in the system. Each transaction is recorded with a timestamp and a link to one or more core records, which are associated with documents in the system, providing superior traceability and verifiability. In some embodiments cash accounting module 820 is not coupled to any actual bank account. The following steps are an example of steps that could be taken; various different data structures, flow controls, or sequences of operations are also contemplated and understood to be possible according to the present disclosure.

At step 801, a double-entry bookkeeping procedure is requested and begins. At step 802, stock grants for a company are identified; this may be new stock grants, for an update operation, or all issued stock grants, for a verification procedure. Each identified stock grant has an associated document. Stock grants as used in this section may include stock option grants. At step 803, each of the identified stock grant documents is reviewed and each individual grant in each document is added to a queue to be processed (this is helpful as some documents contain multiple grants). At step 804, for each grant in the queue, a number of stocks in the grant, as well as the recipient of the grant are identified.

At step 805, for each grant, in the case of options, the number of granted options are subtracted from a stock grant option account, which may be an incentive stock option account. The subtraction of options at step 805 is performed in conjunction with addition of the granted options to the user's granted stock option account at step 808. The accounts may be kept up to date by maintaining a list of all transactions, together with the associated metadata, e.g., documents and core records. In some embodiments, the accounts may be precomputed and cached to enable low-latency interactivity, rather than recomputing all accounts for each transaction. In some embodiments, the precomputing operation may be scheduled and performed during an expected downtime or asynchronously. In some embodiments, certain data are marked read-only, further enhancing speed.

At step 806, the equity accounting module may also be enabled to handle share grants by subtracting granted shares from an outstanding shares account, together with addition of the granted shares to the user's granted shares account 809. The use of this technique enables the system to verify that all sums add to zero at steps 811 (for equity) and 823 (for cash).

When options are exercised, the system generates an option exercise document that indicates that cash was received by the company for the shares. Therefore, it may be helpful to maintain a cash accounting module 820 in addition to the equity accounting module 810. When cash is received for option exercise, it may be added to the company's cash account 821 and may be debited from the user's cash account 822. In some embodiments, the cash account may reflect user interaction with the system explaining that cash has changed hands, without necessarily requiring a connection between the system and an actual electronic bank account for holding cash of the company. Even without being coupled to a bank account, the cash accounting module provides the advantage of being able to document the legally binding exercise of a stock option. Fractional shares are not used, in some embodiments.

Figure 9:
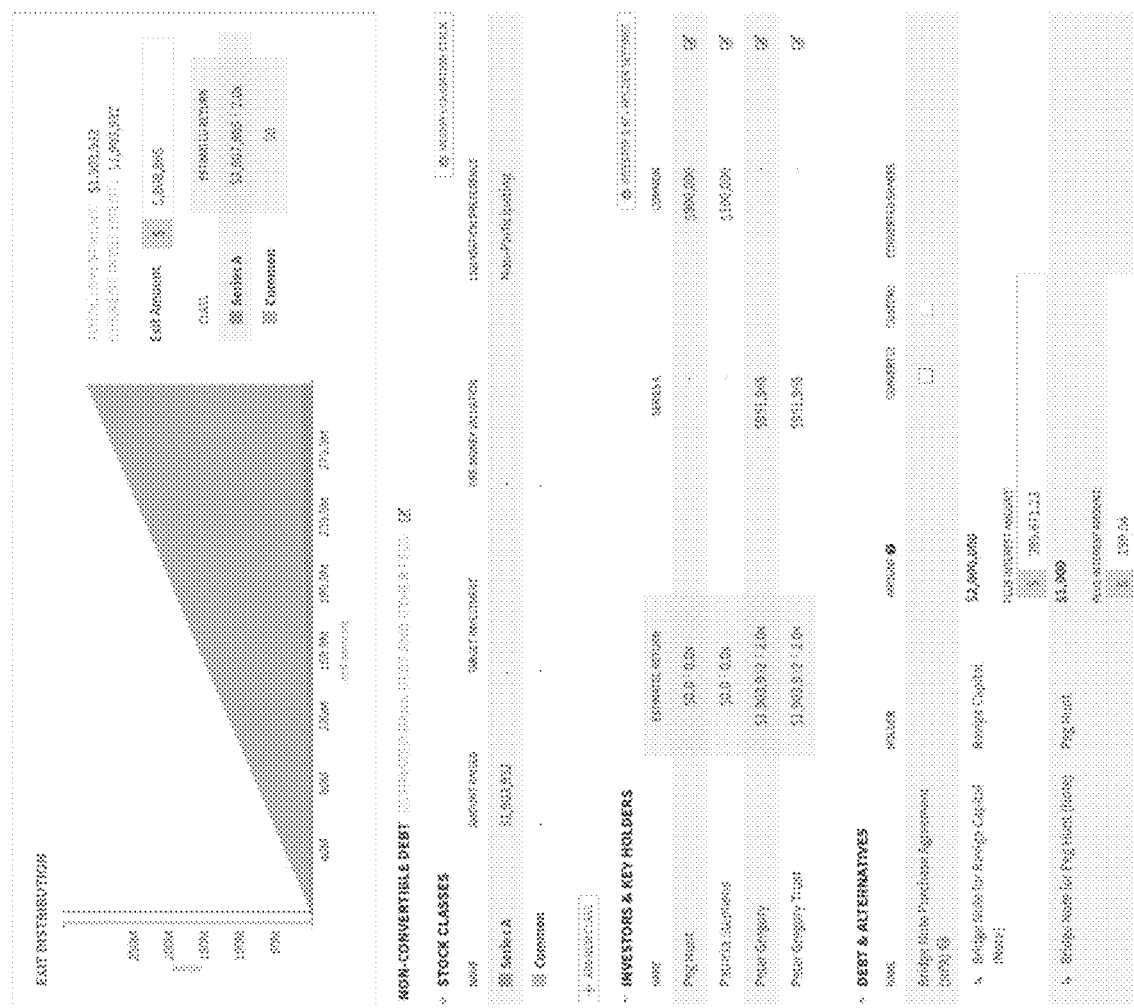
FIG. 9 is an exemplary screen of an exit scenario planner, in accordance with some embodiments.

FIG. 9 is an exemplary screen of an exit scenario planner, in accordance with some embodiments. At the top is a chart graphically showing a range of exit distributions, with different classes of stock being shown as different colors. Further information about the exit distribution chart is discussed with regard to FIGS. 11 and 12. A scenario is shown with two classes of stock, a Series A class and a common stock class. Series A is non-participating. The user is able to understand a projected return on investment given the specific parameters of the currently-issued stock, and given any particular exit amount. The exit scenario planner thereby allows for a more-accurate view, showing increased diversity in outcomes, and also allows a user to understand outcomes over a range of valuations (which may be understood roughly to correspond to time, in the case of a growing company).

The exit scenario planner also may include one or more of: a section showing stock classes; a section showing investors and key stock holders; and one or more sections showing convertible and non-convertible debt and debt alternatives. Debt issues are typically not editable, in some embodiments, as any debt is issued interactively using workflows outside of the scenario planner; this allows for various types of debt, such as SAFEs, KISSes, or NPAs, to be shown accurately together without unnecessary detail. The sections contain information that is up to date with the current state of the company. Where helpful, an estimated investment return is also shown for each investor or class of stock. Exit costs, interest rates on debt, etc. are reflected in the charts, in some embodiments.

User interactivity is a significant benefit of the present disclosure. Additionally, certain sections allow for interactive user input to enable projection of various scenarios. As shown, the exit amount for the company is a user-editable parameter; new classes of stock may be added; the liquidation stack may be modified or reordered; and certain parameters regarding debt are editable, such as an interest amount (which may be entered as a percentage or as a dollar amount, with calculation of interest being performed in some embodiments using the current date in conjunction with the date that the debt was issued, which is retrieved from the system, providing enhanced reliability and accuracy. Since some of the investment shown is hypothetical, the planner shows a sum of current investment and hypothetical investment.

Certain scenarios around convertible debt are enabled to be modeled. For example, the user may indicate whether or not any specific tranche of debt will convert, and may indicate using a custom checkbox that only a certain amount of the issued debt will be converted. All numbers and charts may update immediately once the user enters data, in some embodiments. The entered data may be transient and/or may be stored by the web app separately from the core records of the company, in some embodiments. Additionally, certain user interface controls may display additional data using mouseovers, for example, specific estimated returns for any x,y coordinate on the chart.

Entities are supported for representation as well as individuals, with both individuals and entities being represented within the system. This allows the system to provide rollup views of all investments for a particular entity or a particular user, as well as allowing the system to distinguish between multiple investments made using different investment vehicles, e.g., the Peter Gregory Trust versus Peter Gregory investing as a natural person.

Figure 10:
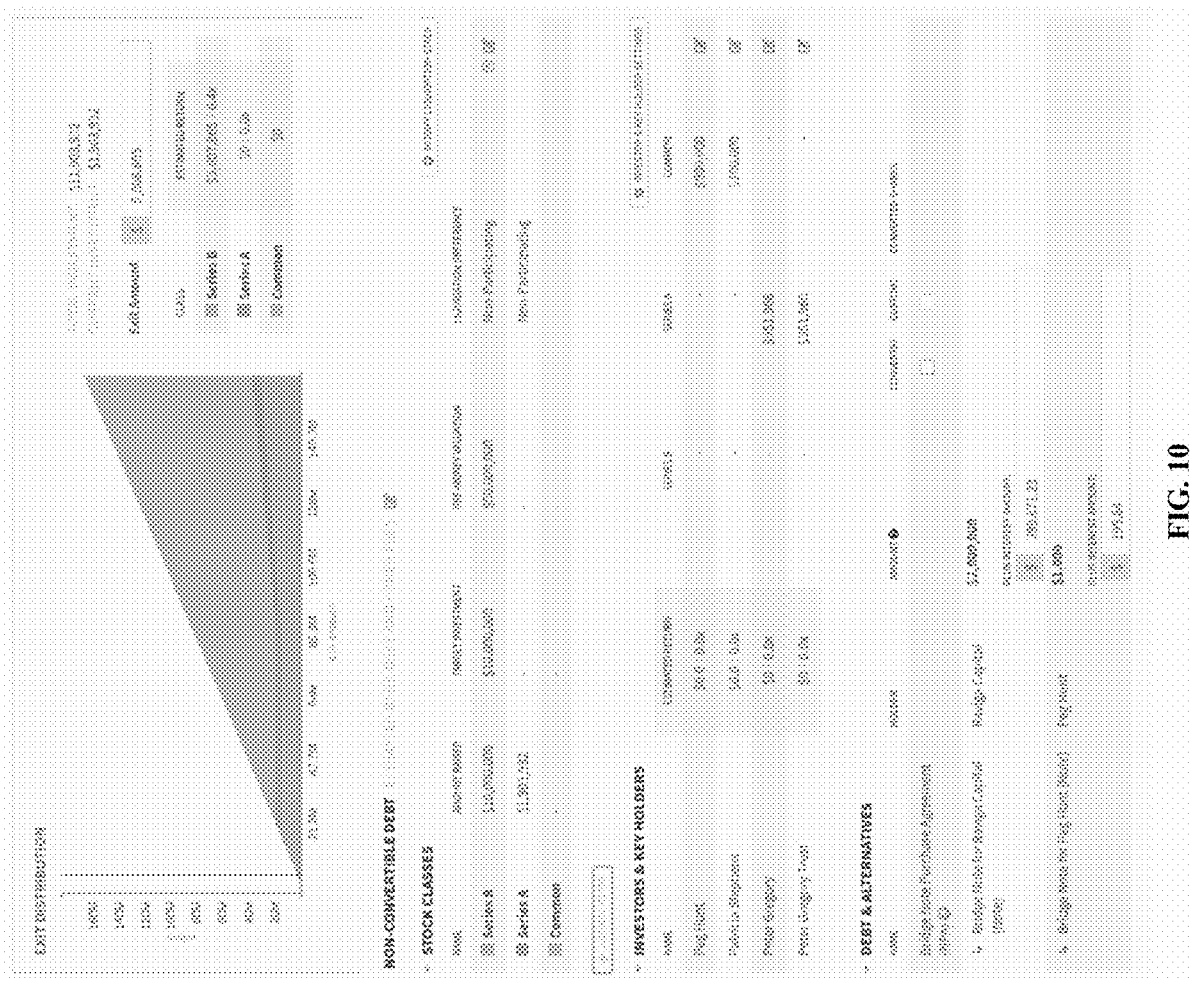
FIG. 10 is a further exemplary screen of an exit scenario planner, in accordance with some embodiments.

FIG. 10 is a further exemplary screen of an exit scenario planner, in accordance with some embodiments. A scenario is shown with three classes of stock, a Series A class, a Series B class, and a common stock class. Series A and Series B are both non-participating. The user is able to understand a projected return on investment given the specific parameters of the currently-issued stock, and given any particular exit amount. In this scenario, the Series B class is being considered for issue by the company. Using the exit scenario planner, it is possible for a decision-maker, such as a company executive or investor, to understand the impact of issuing a new class of stock. Here, as a result of the terms of the liquidation stack, the new Series B class of stock will receive all money from a liquidation of the company until the company's valuation reaches approximately $20 mm, as shown by the chart. Any number of share classes can be added and configured, and they will be reflected in the investment return numbers and share issuance numbers.

Figure 11:
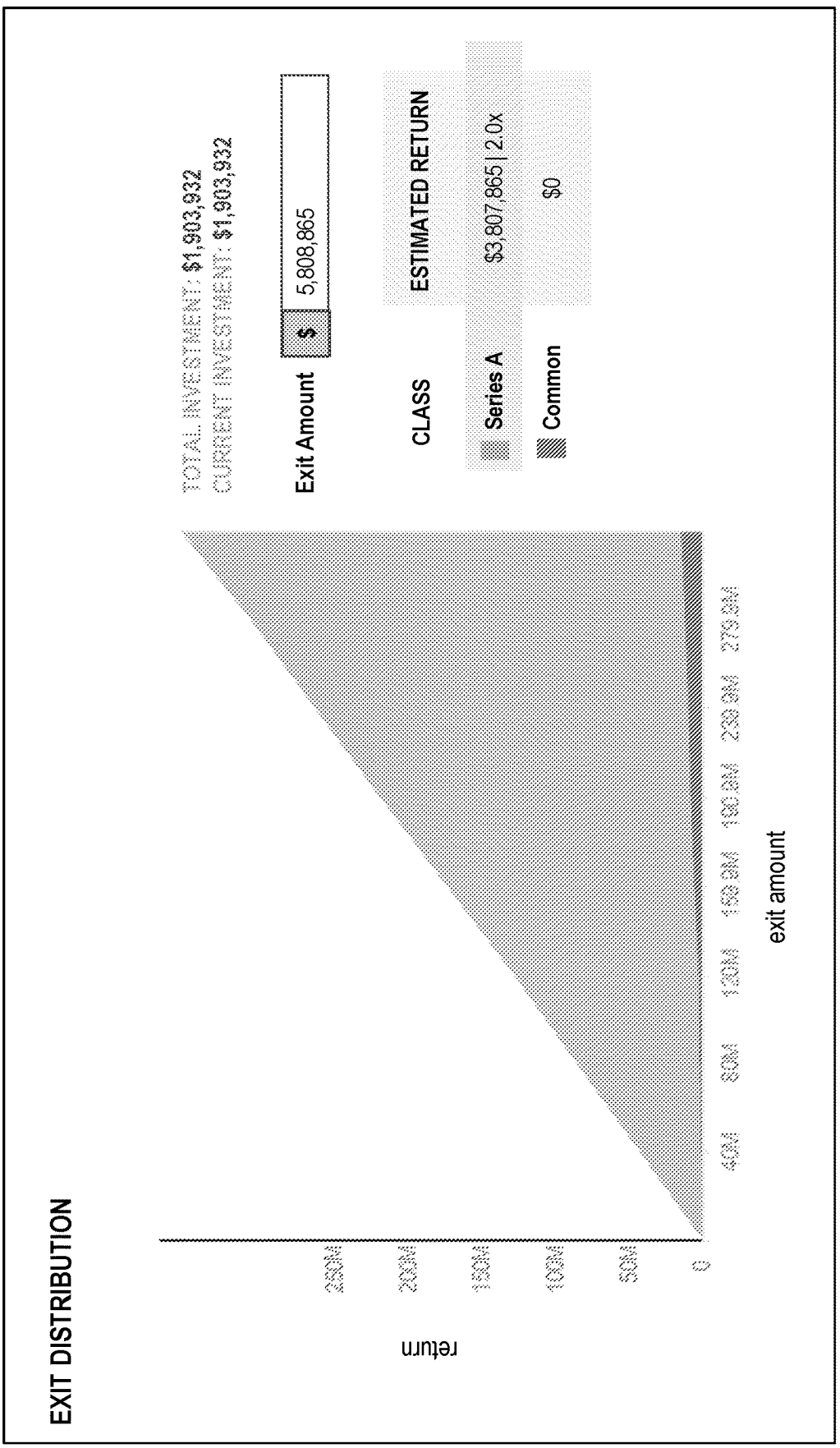
FIG. 11 is an exemplary chart of a first exit distribution scenario, as shown by an exit scenario planner, in accordance with some embodiments.

FIG. 11 is an exemplary chart of a first exit distribution scenario, as shown by an exit scenario planner, in accordance with some embodiments. The chart is as shown in FIG. 9. Plotting participation/investment return against the independent variable of exit amount allows for a number of scenarios to be explored, together with the relative impact of different exit amounts on each class of stock.

Figure 12:
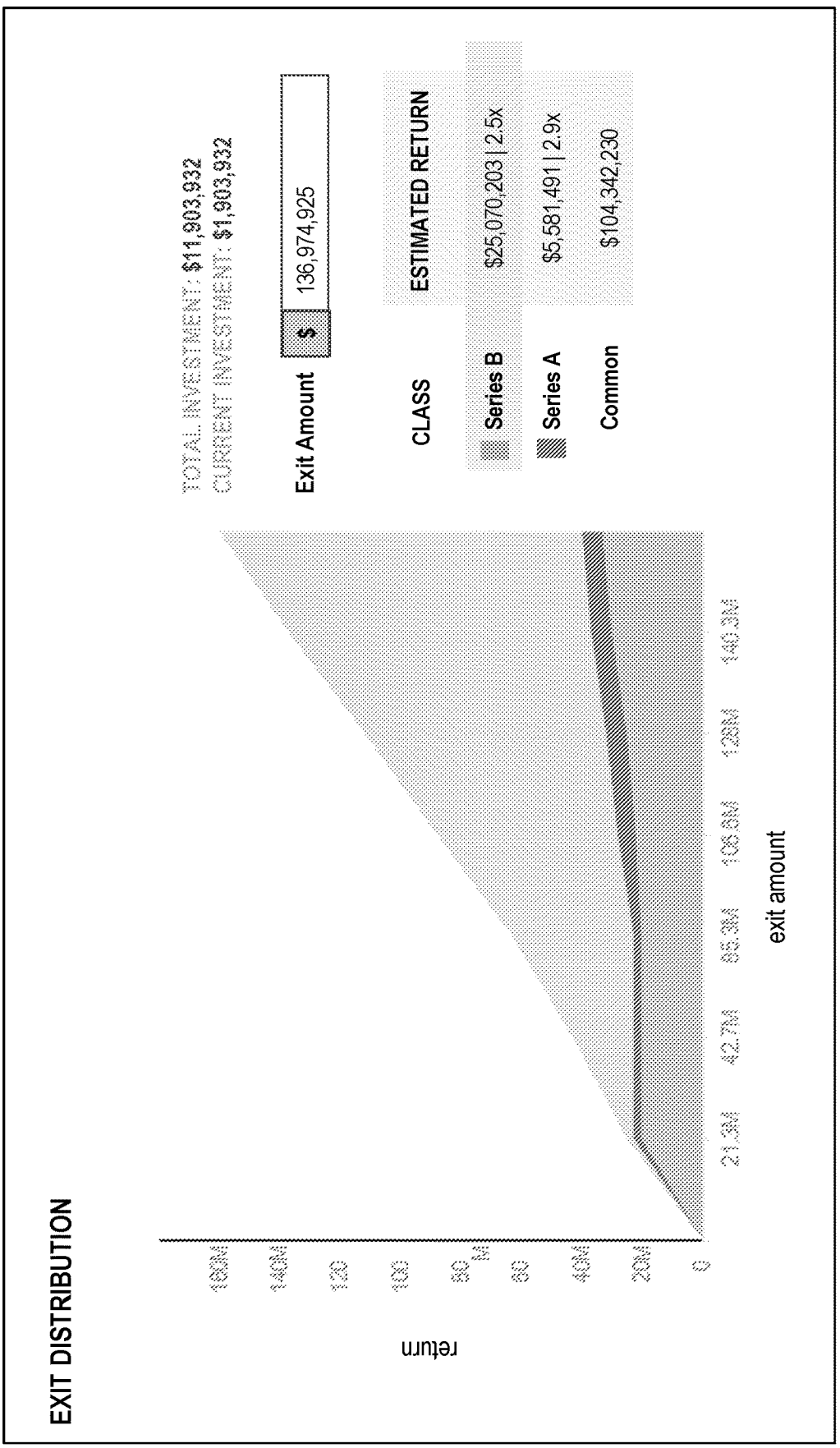
FIG. 12 is an exemplary chart of a second exit distribution scenario, as shown by an exit scenario planner, in accordance with some embodiments.

FIG. 12 is an exemplary chart of a second exit distribution scenario, as shown by an exit scenario planner, in accordance with some embodiments. The chart is as shown in FIG. 10. Noteworthy is that the estimate of return is computed using all outstanding shares and projected shares, including option pools, debt, debt interest, liquidation preferences, and other terms that are often not included in computation by competing tools. The precision of the projection allows for the chart to reflect subtle dynamics that are the result of the liquidation preferences. Here, Series B stock and Series A stock are paid out at the same time (pari passu) until an exit of approximately $21.3 mm, at which point the common stockholders receive their exit payout. At approximately $85.3 mm, both Series B and Series A are converted to common and benefit at the same rate as common stockholders.

Figure 13:
FIG. 13 is an exemplary screen of a next round planner, in accordance with some embodiments.

FIG. 13 is an exemplary screen of a next round planner, in accordance with some embodiments. Two pie charts at top show ownership of a company according to a pre-money and a post-money basis. The pie chart format is used to show relative numbers of shares for each stock class. A specific list of stock classes, together with investment amounts and valuations, is shown below in a table; pre- and post-money ownership is shown as two different percentages. An employee options pool is listed, which size is based on documents stored in the system (hence, not editable for scenario planning). New classes and investors can be added, and investments for individual investors can be added. A percentage share of an investment round is also shown. Debt and alternatives are also listed as with the exit scenario planner.

Figure 14:
FIG. 14 is a further exemplary screen of a next round planner, in accordance with some embodiments.

FIG. 14 is a further exemplary screen of a next round planner, in accordance with some embodiments. Here, a new Series B class of stock has been created, with a desired amount to raise. The amount to raise is being used as the independent variable in this planner, instead of the total valuation, which enables a company executive or manager to determine the effect of raising a certain amount of capital (which may be tied to operational concerns) as opposed to the effect of achieving a particular valuation. Multiple new investments are shown, as well as a conversion of one of the prior-issued bridge notes from debt to Series B shares. Dilution is shown using the pre- and post-money pie chart.

Figure 15:
FIG. 15 is an exemplary screen of a liquidation stack user interface, in accordance with some embodiments.

FIG. 15 is an exemplary screen of a liquidation stack user interface, in accordance with some embodiments. The user is invited to drag to reorder the two priority groups shown: priority group #1, including both Series A and Series B stock, and priority group #2 (common). The liquidation preference is either retrieved from core records or based on prior input from the next round planner or exit planner, and thus is not editable in this screen. Upon saving edits to the liquidation stack, all charts and tables are updated.

FIG. 16 is an exemplary screen of a stock class editor, in accordance with some embodiments. Addition of a new, hypothetical stock class is performed using user-entered data for a small number of variables, here shown as new investment amount, pre-money valuation, and liquidation preference. Liquidation preference is also broken down to participating or non-participating, and liquidation multiplier. The system is able to generate the remaining values, or the user can override the calculated values and provide new values. In some embodiments, values entered in the stock class editor may be cached by a web application and enabled to be used to subsequently generate term sheets and legally-binding corporate documents such as board resolutions. In some embodiments, various types of liquidation preference may be accommodated, such as: fully-participating; capped participation; and partial participation.

In some embodiments, pro rata rights (or pro rata participation rights) and pro rata investments for scenario planning may be supported. "Pro rata rights" are commonly understood to mean contractual rights given to an investor the right to participate in a subsequent round (to buy stock in the subsequent round) of funding to maintain their level of percentage ownership in a company. For example, if an investor owns 1% of the shares of a company after a funding round, the investor may be given the right to buy 1% of the shares in a subsequent funding round, at the then-current share price. If the investor exercises this right, the investor will continue to own 1% of the shares of the company after the new investment. Further details are well known by those having skill in the art.

The system is able to provide a user control, in some embodiments, to choose a scenario in which an investor exercises pro rata rights, in some embodiments. This may be in the context of an investor planning an additional investment, or may be in the context of a startup founder planning an exit. This may involve retrieval of pro rata rights core records for that investor. Each investment in a previous round may be reviewed for pro rata rights, and a scenario planning workflow may present checkboxes for a user of the system to model a scenario in which investors exercise their pro rata rights. This may be part of the exit scenario planner, the next round planner, or another module. This may be configured to enable interactive modeling of investor pro rata investment rights. This may be configured to be operated by investor users or company founder users. Pro rata rights may be modeled using the same accurate scenario calculator used by the system, including using information about each investor's stock holdings and deal terms, and including using information about other investors and investments, ensuring accuracy beyond a simple spreadsheet workbook.

The foregoing discussion discloses and describes merely exemplary embodiments of the present invention. As will be understood by those skilled in the art, the present invention may be embodied in other specific forms without departing from the spirit or essential characteristics thereof. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and system can generally be integrated together in a single software product or packaged into multiple software products.

The above-described features and applications can be implemented as software processes that are specified as a set of instructions recorded on a computer-readable storage medium (also referred to as computer readable medium). When these instructions are executed by one or more processing unit(s) (e.g. one or more processors, cores of processors, or other processing units), they cause the processing unit(s) to perform the actions indicated in the instructions. Examples of computer readable media include, but are not limited to, CD-ROMs, flash drives, hard drives, RAM chips, EPROMs, etc. The computer-readable media does not include carrier waves and electronic signals passing wirelessly or wired connections. Code may be written in any combination of programming languages or machine-readable data formats, each suitable to its particular application, including but not limited to: C, C++, Java, Python, Ruby, R, Lua, Lisp, Scala, JSON, JavaScript, YAML, XML, HTML, etc. Services may be RESTful and may be implemented using generic hooks, including over HTTP, HTTPS, SCTP, IP, TCP, JSON, JavaScript, etc., as well as via inter-process communication on one or more real or virtual machines or containers, e.g., IPC, shared memory, shared filesystem, UNIX pipes and the like. A Linux or POSIX environment may be used. Containers may be Docker, Jetty, Tomcat, Wildfy, Springboot, LXD, unikernels, OpenVZ, RKT, Windows Server, Hyper-V, or any other type of container, or may be, in some embodiments, virtual machines or images, etc. Network access may be relied upon or may be avoided, in various embodiments. A networking fabric may be provided among the different containers, in some embodiments. As is well-known, the benefit of using cloud infrastructure is that it is simple to mix heterogeneous resources and to scale services up or down based on load and desired performance.

In the specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronics systems, define one or more specific machine implementations that execute and perform the operations of the software programs.

A computer program (also known as program, software, software application, script, or code) can be written in any form of programming language, including compiled or interpreted languages, declarative or procedural languages, and it can be deployed in any form, including as a standalone program or as a module, component, subroutine, object, or another unit suitable for use in a computing environment. A computer program may, but need not correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

These functions described above can be implemented in digital electronic circuitry, in computer software, hardware, or firmware. The techniques can be implemented using one or more computer program products. Programmable processors and computers can be included in or packaged as mobile devices. The process and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), readable compact discs (CD-R), rewritable compact discs (CD-RW), read-only digital versatile discs (e.g., DVD-ROM, dual-layer DVD-ROM), a variety of recordable/rewritable DVDs (e.g. DVD-RAM, DVD-RW, DVD+RW, etc.), flash memory (e.g., SD cards, mini-SD cards, micro-SD cards, etc.), magnetic or solid-state hard drives, read-only and recordable Blu-Ray® discs, ultra-density optical discs, any other optical or magnetic media, and floppy disks. The computer-readable media can store a computer program that is executed by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored in the circuit itself.

As used in this specification and any claims of this application, the terms "computer", "server", "processor", and "memory" all refer to electronic or other technological devices. These terms exclude people or groups of people. For the purpose of the specification, the terms display or displaying means displaying on an electronic device. As used in this specification and any claims of this application, the terms "computer-readable media" and "computer readable medium" are entirely restricted to tangible, physical objects that store information in a form that is readable by a computer. These terms exclude any wireless, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, or any other available monitor types, for displaying information to the user and a keyboard and a pointing device, e.g., mouse or trackball, by which the user can provide input to the computer. Other kinds of devices can be used to provide for interaction with a user as well; for example, feedback provided to the user can be any form of sensory feedback, e.g., visual feedback, tactile feedback, or auditory feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication network include a local area network ("LAN"), an inter-network (e.g., the Internet), and peer-to-peer networks (e.g., ad-hoc peer-to-peer networks).

The subject matter described in this specification can be implemented using client-side applications, web pages, mobile web pages, or other software as generally known in the art and that would be usable to end-user customers (for community self-managed RAN apps) and/or mobile operator end users. The subject matter could alternately be delivered or implemented using an API, such as a SOAP API, a JSON API, a RESTful API, in lieu of or in conjunction with a direct end-user interface. The subject matter could use messaging queues, webhooks, server-side containers, or any other technology known in the art.

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purpose of displaying data to and receiving user input from a user interacting with the client device). Data generated at the client device (e.g., a result of the user interaction) can be received from the client device at the server. Any database could be used (SQL, NoSQL, temporal, key-value, etc.). Any container orchestration technology (Kubernetes, Docker Swarm) could be used.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in singular is not intended to mean "one and only one" unless specifically so states, but rather "one or more." Unless expressly stated otherwise, the term "some" refers to one or more. Pronouns in the masculine (e.g., his) include the feminine and neuter gender (e.g., her and its) and vice versa. Headings and subheadings, if any, are used for convenience only, and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations or one or more configurations. A phrase, for example, a configuration may refer to one or more configurations and vice versa.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative of, but not limiting of, the scope of the invention.

The invention claimed is:

1. A system for providing real-time equity planning information for a corporation, comprising:
   an equity database storing core records pertaining to an incorporated legal entity in a computer system;
   an accounting module coupled to the equity database; and
   an output processing module,
   wherein core records in the equity database for a particular equity transaction are stored in the equity database in association with underlying equity transaction documents for the incorporated legal entity, and the equity database is configured to reflect stock holdings of the incorporated legal entity by any individual or entity;
   wherein the accounting module further comprises an equity double accounting module, and wherein the equity double accounting module is configured to subtract a number of shares from a share account of the incorporated legal entity whenever a same number of shares is added to a share account of an individual or entity;
   wherein the accounting module further:
      identifies core records in the equity database for the incorporated legal entity,
      retrieves an entity record for the incorporated legal entity based on the identified core records, and
      updates the entity record for the incorporated legal entity based upon the underlying equity transaction documents, comprising:
         identifying new values for one or more entries in the entity record from the underlying equity transaction documents,
         creating a lineage entry in the entity record for each of the entries that have new values, the lineage entry comprising an existing value for the entry, the new value for the entry, a timestamp, and a value source referring to an underlying equity transaction document from which the existing value is sourced, and
         replacing, for each of the entries in the entity record that have a new value, the existing value with the new value and the existing value source with a new value source referring to an underlying equity transaction document from which the new value is sourced;
   wherein the accounting module further comprises a monetary double accounting module for tracking of monetary accounts, and wherein the monetary double accounting module is configured to make a debit to a monetary account of the individual or entity when a credit is made to a monetary account of the incorporated legal entity; and
   wherein the accounting module asynchronously precomputes and caches one or more of the share account of the incorporated legal entity and the monetary account of the individual to enable low-latency interactivity with one or more remote computing devices.

2. The system of claim 1, wherein the equity database is configured to reflect all stock holdings of the incorporated legal entity by any individual or entity.

3. The system of claim 1, wherein human-readable documents in Portable Document Format (PDF) format are stored in association with the core records.

4. The system of claim 1, wherein each of the core records reflects an issuance of shares in the incorporated legal entity to a particular entity or person.

5. The system of claim 1, wherein at least one of the underlying equity transaction documents comprises a stock option grant document, and the stock option grant document includes, as metadata, one or more of: a date an option grant was awarded; an incentive or non-qualified type of options; a number of shares granted; a price per share; a number of shares exercised; a vested number and an unvested number of shares; identification of options canceled; a total number of shares outstanding; an exercisable number of shares.

6. The system of claim 5, wherein the stock option grant document includes one of: a stock grant document; a stock certificate; a simple agreement for future equity (SAFE); a keep it simple security (KISS); a convertible debt note; or a stock purchase agreement.

7. The system of claim 1, wherein the output processing module is configured to output a capitalization table of the incorporated legal entity in Hypertext Markup Language (HTML) or spreadsheet format, and wherein the capitalization table accurately reflects equity holdings by all investors in the incorporated legal entity at a time of generation of the capitalization table.

8. The system of claim 1, wherein the output processing module is a next round planner for understanding a potential impact of raising a new round of funding for the incorporated legal entity, and wherein the output processing module is configured to output in an interactive format.

9. The system of claim 1, wherein the output processing module is an exit scenario planner, the exit scenario planner configured to receive growth scenario assumptions as additional user input and configured to calculate valuations of the incorporated legal entity and stock holdings for investors in the incorporated legal entity based on the growth scenario assumptions, and wherein the output processing module is configured to output in an interactive format.

10. The system of claim 1, wherein the output processing module is configured to enable interactive modeling of investor pro rata investment rights.

11. The system of claim 1, wherein the output processing module is configured to display one or more underlying share issuance documents in a paginated view.

12. The system of claim 1, wherein the accounting module receives instructions to process the particular issuance of shares from an authenticated user, and wherein the authenticated user is authenticated based on core records for the incorporated legal entity.

13. The system of claim 1, wherein the equity double accounting module is separate from, but interoperates with, the monetary double accounting module.

14. The system of claim 1, wherein the underlying equity transaction documents are an equity exercise agreement between an individual and the incorporated legal entity, executed on, and stored in, the system.

15. The system of claim 1, wherein the equity double accounting module is configured to check that the number of shares subtracted from the share account of the incorporated legal entity is equal to the same number of shares is added to a share account of an individual or entity.

16. The system of claim 1, wherein the monetary double accounting module is configured to check that an amount of the debit to the one account is equal to an amount of the credit to the another account.

17. The system of claim 1, wherein the equity database and the accounting module are configured to enable an equity transaction to be performed verifiably, such that the share account of the incorporated legal entity, the share account of the individual or entity, the monetary account of the individual or entity, and the monetary account of the incorporated legal entity are made to be up to date as part of a single transaction.

\* \* \* \* \*